US009938764B2

(12) United States Patent
Huang et al.

(10) Patent No.: US 9,938,764 B2
(45) Date of Patent: Apr. 10, 2018

(54) WINDOW SHADE, ACTUATING SYSTEM AND OPERATING METHOD THEREOF

(71) Applicant: TEH YOR CO., LTD., Taipei (TW)

(72) Inventors: Chin-Tien Huang, New Taipei (TW); Fu-Lai Yu, New Taipei (TW)

(73) Assignee: TEHYOR CO., LTD., Taiwan (CN)

( * ) Notice: Subject to any disclaimer, the term of this patent is extended or adjusted under 35 U.S.C. 154(b) by 0 days.

(21) Appl. No.: 14/732,899

(22) Filed: Jun. 8, 2015

(65) Prior Publication Data
US 2017/0114592 A1    Apr. 27, 2017

(51) Int. Cl.
| A47H 13/00 | (2006.01) |
| A47H 15/00 | (2006.01) |
| E06B 3/00  | (2006.01) |
| E06B 9/00  | (2006.01) |
| E06B 9/322 | (2006.01) |

(52) U.S. Cl.
CPC .................................. *E06B 9/322* (2013.01)

(58) Field of Classification Search
CPC ............... E06B 9/322; E06B 2009/785; E06B 2009/725; E06B 9/78; E06B 2009/2627; E06B 2009/3225; E06B 9/76; E06B 2009/3222; E06B 2009/905; E06B 9/305
See application file for complete search history.

(56) References Cited

U.S. PATENT DOCUMENTS

| 6,843,302 | B2 * | 1/2005 | Nijs ........................ E06B 9/56 160/298 |
| 7,360,574 | B2 * | 4/2008 | Maumi .................. E06B 9/303 160/170 |
| 9,062,492 | B2 * | 6/2015 | Yu .......................... E06B 9/322 |
| 9,187,951 | B2 * | 11/2015 | Yu .......................... E06B 9/322 |
| 9,284,774 | B2 * | 3/2016 | Yu ............................. E06B 9/38 |
| 9,528,318 | B2 * | 12/2016 | Huang .................... E06B 9/262 |
| 2006/0283561 | A1 * | 12/2006 | Maumi ................... E06B 9/322 160/176.1 R |
| 2009/0120592 | A1 * | 5/2009 | Lesperance ............ E06B 9/322 160/84.02 |
| 2011/0209836 | A1 * | 9/2011 | Yu .......................... E06B 9/322 160/305 |
| 2012/0048485 | A1 * | 3/2012 | Fu-Lai ................... E06B 9/322 160/331 |
| 2013/0220561 | A1 | 8/2013 | Yu et al. |
| 2013/0340951 | A1 | 12/2013 | Yu et al. |
| 2017/0191310 | A1 * | 7/2017 | Huang .................... E06B 9/322 |

FOREIGN PATENT DOCUMENTS

EP    1431507 A2 *    6/2004    ............. E06B 9/307

OTHER PUBLICATIONS

International Search Report and Written Opinion in co-pending PCT Appl. No. PCT/US2015/035638, dated Feb. 25, 2016.

* cited by examiner

*Primary Examiner* — Katherine W Mitchell
*Assistant Examiner* — Jeremy C Ramsey
(74) *Attorney, Agent, or Firm* — Daniel A. Tallitsch; Baker McKenzie

(57) ABSTRACT

The structures described herein use an actuating system that can selectively switch between a lower and a raise mode of operation by rotating a rod assembly in two different directions, and use a downward displacement of a pull member to lower and raise the window shade depending on its switching state. The actuating systems are simple to operate, allow convenient adjustment of the window shade, and are safe as the pull member has a limited length of extension.

23 Claims, 27 Drawing Sheets

WINDOW SHADE, ACTUATING SYSTEM AND OPERATING METHOD THEREOF

CROSS-REFERENCE TO RELATED APPLICATION(S)

This application respectively claims priority to U.S. Provisional Patent Application No. 62/009,361 filed on Jun. 9, 2014, and to U.S. Provisional Patent Application No. 62/063,019 filed on Oct. 13, 2014, both of which are incorporated herein by reference.

BACKGROUND

1. Field of the Invention

The present invention relates to window shades, and actuating systems used in window shades.

2. Description of the Related Art

Many types of window shades are currently available on the market, such as Venetian blinds, roller shades and honeycomb shades. The shade when lowered can cover the area of the window frame, which can reduce the amount of light entering the room through the window and provided increased privacy. Conventionally, the window shade is provided with an operating cord that can be actuated to raise or lower the window shade. In particular, the operating cord may be pulled downward to raise the window shade, and released to lower the window shade.

In a conventional construction of the window shade, the operating cord can be connected with a drive axle. When the operating cord is pulled downward, the drive axle can rotate to wind suspension cords for raising the window shade. When the operating cord is released, the drive axle can be driven to rotate in a reverse direction for lowering the window shade.

However, this conventional construction may require to use an increased length of the operating cord for window shades that have greater vertical lengths. The greater length of the operating cord may affect the outer appearance of the window shade. Moreover, there is the risk of child strangle on the longer operating cord. To reduce the risk of accidental injuries, the operating cord may be maintained at a higher position so that a young child cannot easily reach the operating cord. Unfortunately, when the operating cord is pulled downward to raise the window shade, the operating cord may still move to a lower position and become accessible for a child. With respect to a regular user, the manipulation of longer operating cords may also be less convenient. For example, the longer operating cord may become entangled, which may render its operation difficult.

To remedy the above disadvantages, certain existing approaches propose a mechanism that can be actuated by repeated pulling actions applied on a cord for raising the window shade. However, these approaches usually need a manual action different from the pulling action for lowering the window shade.

Therefore, there is a need for a window shade that is simple to operate, and address or improve at least the foregoing issues.

SUMMARY

The present application describes a window shade, an actuating system for use with the window shade, and a method of operating the same.

In one embodiment, the actuating system includes a transmission axle rotatable to collapse and expand a window shade, a driving unit including a pull member, a drive transmission assembly connected with the transmission axle and including a switch member, and a rod assembly connected with the switch member via a switch actuating mechanism. The pull member is operable to cause the driving unit to provide a rotational output in a first direction. The switch member is movable between a first and a second position to selectively enable either of a first and a second mode of transmission of the drive transmission assembly for transmitting the rotational output from the driving unit to the transmission axle, the rotational output of the driving unit in the first direction driving rotation of the transmission axle in a second direction opposite to the first direction in the first mode of transmission, and the rotational output of the driving unit in the first direction driving rotation of the transmission axle in the same first direction in the second mode of transmission. The rod assembly is respectively rotatable in a first switching direction to displace the switch member to the first position, and in a second switching direction opposite to the first switching direction to displace the switch member to the second position.

In other embodiments, a window shade is described. The window shade includes a head rail, a bottom part, a shading structure arranged vertically between the head rail and the bottom rail, a winding unit having a suspension member connected with the bottom part, and the actuating system arranged in the head rail. The winding unit is rotationally coupled with the transmission axle, wherein the transmission axle rotates in the second direction to cause unwinding of the suspension member from the winding unit for lowering the bottom part, and in the first direction to wind the suspension member into the winding unit for raising the bottom part.

In addition, the present application describes a method of operating a window shade. The window shade includes a shading structure, a drive transmission assembly selectively operable in either of a first and a second mode of transmission for lowering or raising the shading structure, and a rod assembly operatively connected with the drive transmission assembly and extending substantively vertically. The method includes rotating the rod assembly in a first switching direction to select the first mode of transmission for lowering the shading structure, and rotating the rod assembly in a second switching direction opposite to the first switching direction to select the second mode of transmission for raising the shading structure.

DETAILED DESCRIPTION OF THE EMBODIMENTS

Figure 1:
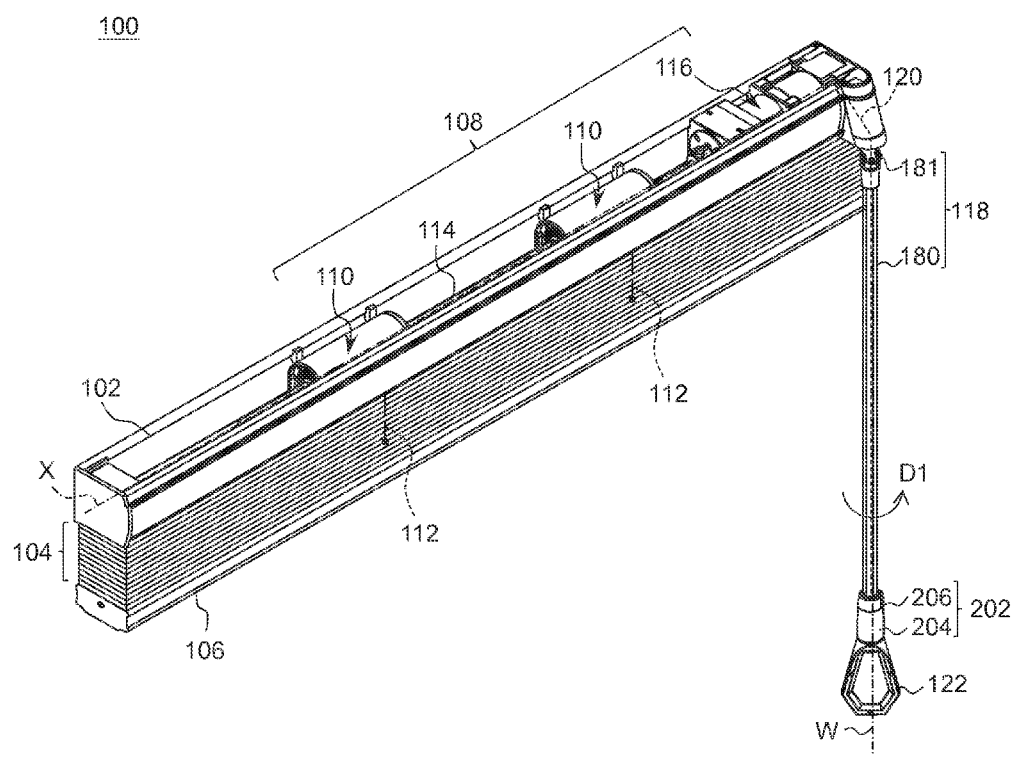
FIG. 1 is a perspective view illustrating an embodiment of a window shade.
Figure 2:
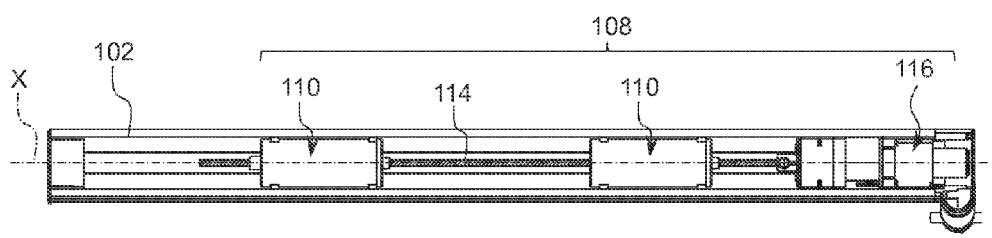
FIG. 2 is top view of the window shade shown in FIG. 1.
Figure 3:
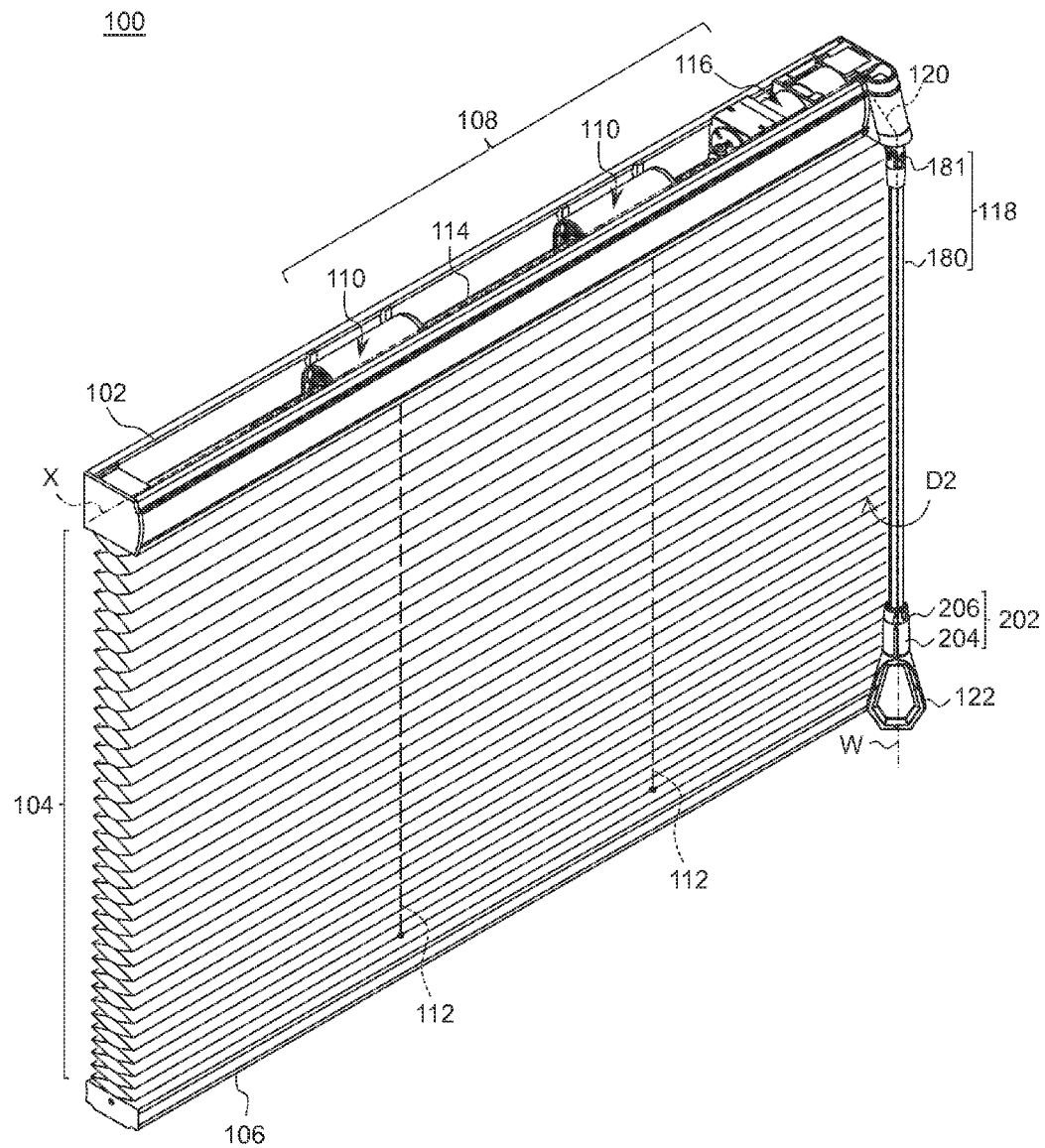
FIG. 3 is a schematic view illustrating the window shade of FIG. 1 in a fully lowered state.

FIG. 1 is a perspective view illustrating an embodiment of a window shade 100, FIG. 2 is a top view illustrating the window shade 100, and FIG. 3 is a schematic view illustrating the window shade 100 in a fully lowered state. The window shade 100 can includes a head rail 102, a shading structure 104, and a bottom part 106 disposed at a bottom of the shading structure 104. The head rail 102 may be of any types and shapes. The head rail 102 may be affixed at a top of a window frame, and the shading structure 104 and the bottom part 106 can be suspended from the head rail 102.

The shading structure 104 can have any suitable constructions. For example, the shading structure 104 can include a honeycomb structure made from a cloth material (as shown), a Venetian blind construction, or a plurality of rails or slats extending vertically and parallel to one another.

The bottom part 106 is disposed at a bottom of the window shade 100, and is movable vertically relative to the head rail 102 to expand and collapse the shading structure 104. In one embodiment, the bottom part 106 may be formed as an elongated rail. However, any types of weighing structures may be suitable. In some embodiment, the bottom part 106 may also be formed by a lowermost portion of the shading structure 104.

For driving upward and downward displacements of the shading structure 104 and the bottom part 106, the window shade 100 can further include an actuating system 108 comprised of a plurality of winding units 110, a plurality of suspension members 112 (shown with phantom lines in FIG. 1) respectively coupled with the winding units 110, a transmission axle 114, a control module 116, a rod assembly 118 and a pull member 120 (shown with phantom lines in FIG. 1). The suspension members 112 can exemplary be suspension cords that extend vertically between the head rail 102 and the bottom part 106. Each of the suspension members 112 can have a first end portion connected with one corresponding winding unit 110, and a second end portion connected with the bottom part 106. The winding units 110 can respectively have drums rotatable to wind and unwind the suspension members 112 for raising and lowering the bottom part 106.

The transmission axle 114 can extend lengthwise along the head rail 102 to define a longitudinal axis X, and the winding units 110 and the control module 116 and can be coaxially connected with the transmission axle 114. The transmission axle 114 can be actuated through the control module 116 to rotate in either direction, which in turn drives concurrent rotation of the winding units 110 for winding or unwinding the suspension members 112.

In the illustrated embodiment, the pull member 120 can exemplary be a cord. The pull member 120 is connected with the control module 116, and extends at least partially through an interior of the rod assembly 118. The pull member 120 can be pulled downward to drive rotation of the transmission axle 114 in either direction. A handle 122 can be connected with a lower end of the pull member 120 to facilitate its operation, the handle 122 being positionable near to a lower end of the rod assembly 118. The pull member 120 has a length that is smaller than the height of the totally expanded shading structure 104, and the control module 116 is configured such that a user repeatedly applies a sequence of pull and release actions on the pull member 120 to progressively lower or raise the bottom part 106. For example, the overall length of the pull member 120 can be one third of the height of the totally expanded shading structure 104, and the pull member 120 can be repeatedly pulled about three times to entirely lower the shading structure 104. This process is similar to a ratcheting technique allowing the user to pull the pull member 120 to lower or raise the bottom part 106 by a certain amount, allow the pull member 120 to retract, and then actuate the pull member 120 again to continue to lower or raise the bottom part 106. This process may be repeated until the shading structure 104 reaches a desired height.

The control module 116 can include a drive transmission assembly operable in two modes of transmission. More specifically, when the drive transmission assembly of the control module 116 is in a first mode of transmission, the pull member 120 can be pulled downward to drive a downward displacement of the bottom part 106. When the drive transmission assembly of the control module 116 is in a second mode of transmission, the pull member 120 can be pulled downward to drive an upward displacement of the bottom part 106. Moreover, the drive transmission assembly of the control module 116 can be switchable by rotating the rod assembly 118 in any of two switching directions (schematically shown with arrows D1 and D2 in FIGS. 1 and 3) to select any of the aforementioned two modes of transmission. When the pull member 120 is not operated, the suspended weight of the shading structure 104 and the bottom part 106 can be sustained by an arrester, which may also be incorporated in the control module 116. Exemplary construction of the aforementioned drive transmission assembly and arrester will be described hereinafter with reference to the corresponding drawings.

Figure 4:
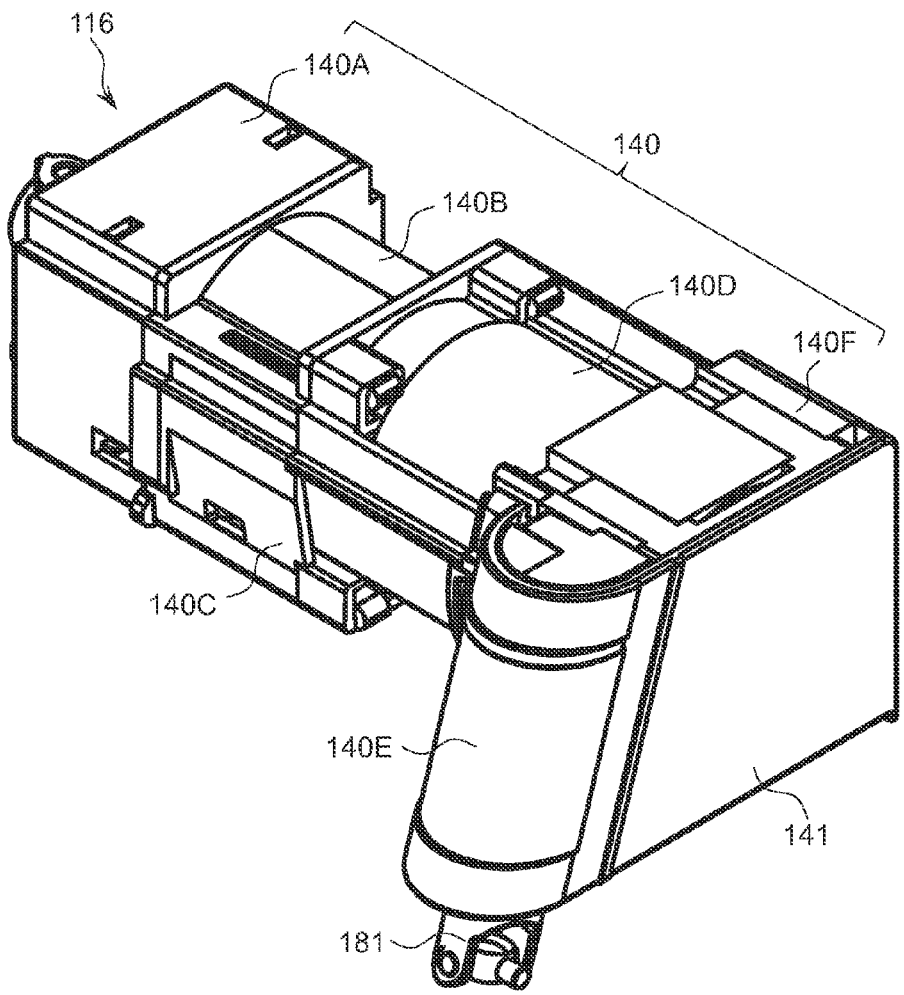
FIG. 4 is a schematic view illustrating a control module used in an actuating system of the window shade shown in FIG. 1.
Figure 5:
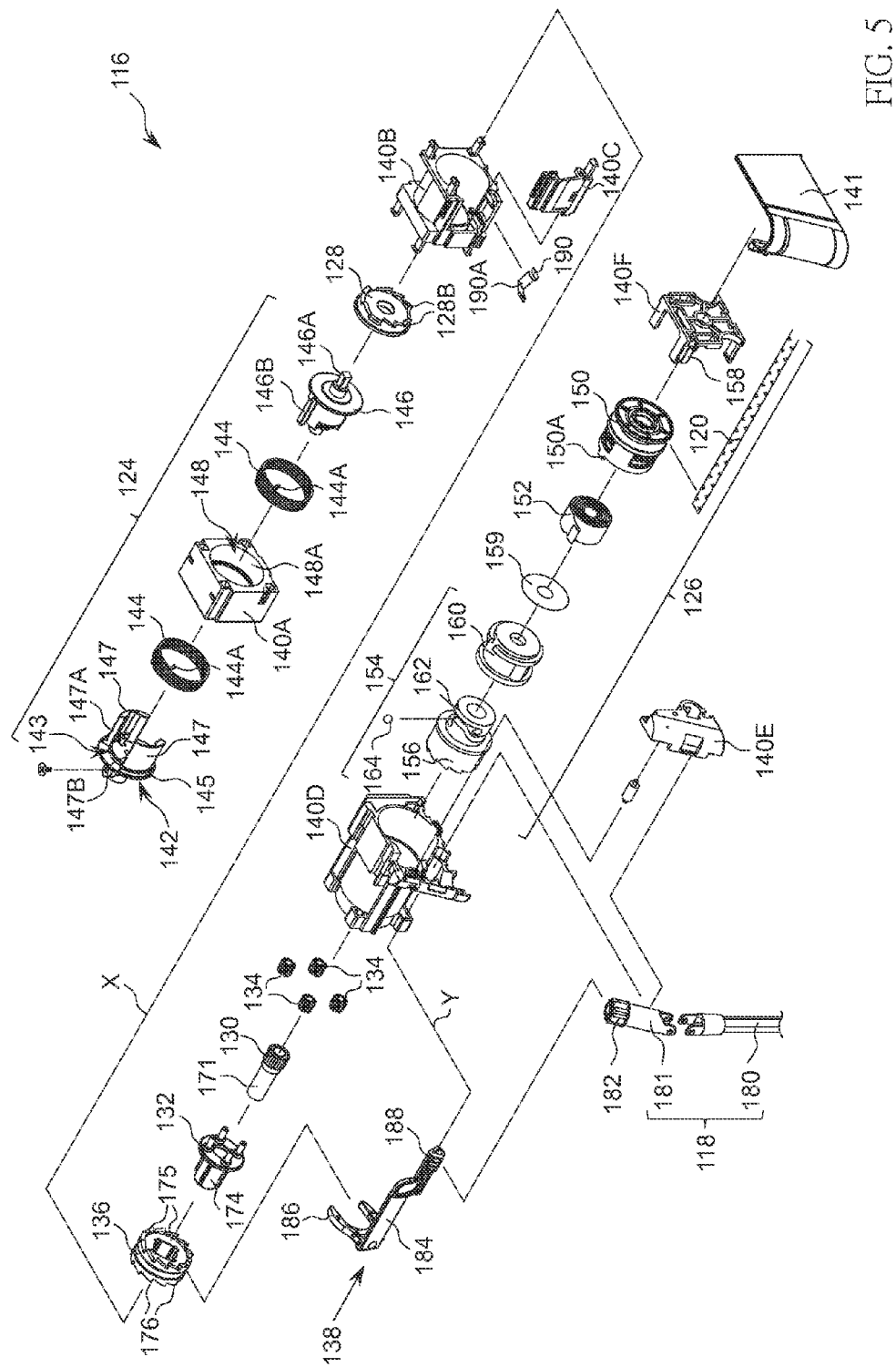
FIG. 5 is an exploded view illustrating an actuating mechanism implemented in the control module shown in FIG. 4.
Figure 6:
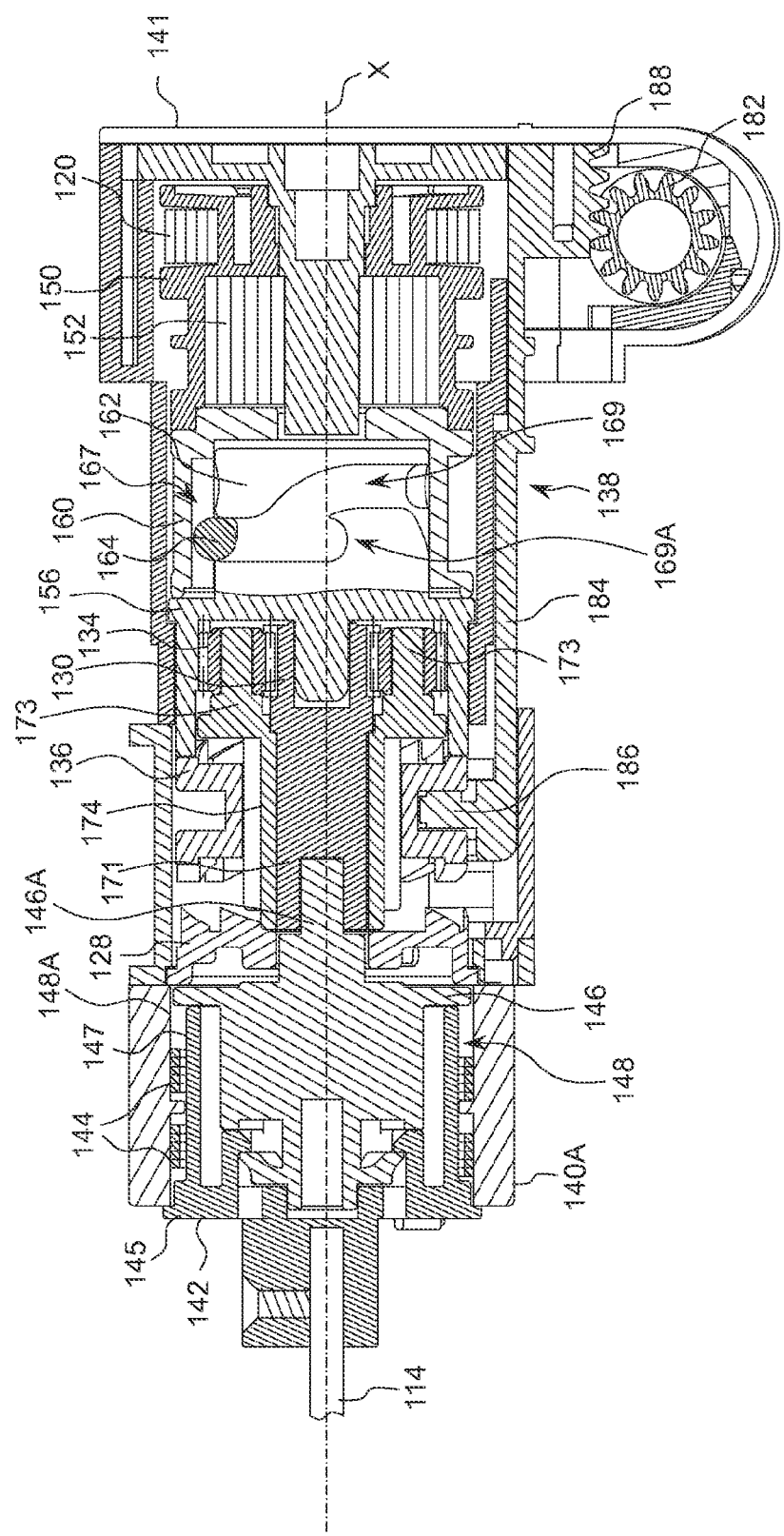
FIG. 6 is a cross-sectional view illustrating the control module shown in FIG. 4.

FIG. 4 is a schematic view of the control module 116, FIG. 5 is an exploded view illustrating a construction of the control module 116, and FIG. 6 is a cross-sectional view illustrating the control module 116. The control module 116 can include an arrester 124, a driving unit 126, a drive transmission assembly comprised of a stop member 128, a central gear 130, a carrier 132, a plurality of planetary gears 134 and a switch member 136, and a switch actuating mechanism 138 operatively connected with the drive transmission assembly. These components of the control module 116 can be arranged in a casing 140 formed by the assembly of multiple housing portions 140A, 140B, 140C, 140D, 140E, and an end cap 140F affixed with one another. Moreover, the casing 140 can be at least partially covered with an outer cover 141 to provide better appearance.

The arrester 124 can include a collar 142, one or more spring 144 (two springs 144 are exemplary shown) and an actuating part 146. The collar 142 can be attached with the transmission axle 114 for unitary rotation therewith. In one embodiment, the collar 142 can have an annular portion 145, and two spaced-apart flanges 147 that respectively project from the annular portion 145. The two flanges 147 can respectively define two flange surfaces 147A and 147B that are offset from the axis of the transmission axle 114 and delimit two opposite sides of a gap 143.

Each of the springs 144 can be a coil spring having two spaced-apart prongs 144A and 144B. The springs 144 are assembled in a cavity 148 of the casing 140 coaxial to the axis of the transmission axle 114, and have respective outer circumferences in contact with an inner sidewall 148A of the cavity 148. The cavity 148 can be provided, e.g., in the housing portion 140A. Moreover, the springs 144 are positioned to encircle the flanges 147 of the collar 142, and the prongs 144A and 144B can be respectively received in the gap 143 between the two flange surfaces 147A and 147B. In other words, the two flange surfaces 147A and 147B are located outside a space 149 (better shown in FIGS. 7-9) delimited between the two prongs 144A and 144B.

The actuating part 146 can include a shaft portion 146A, and a rib 146B eccentric from the axis of the shaft portion 146A. The actuating part 146 can be pivotally assembled coaxial to the axis of the transmission axle 114, the shaft portion 146A being aligned with the transmission axle 114, and the rib 146B being received in the space 149 between the two prongs 144A and 144B of each spring 144. An end portion of the actuating part 146 opposite to the side of the shaft portion 146A can be attached with the transmission axle 114 through a connection that rotationally couples the actuating part 146 with the transmission axle 114 (e.g., the actuating part 146 may be affixed with the collar 142). The actuating part 146 and the transmission axle 114 thus can rotate in unison in two directions to unlock the arrester 124 and either raise or lower the bottom part 106.

Figure 7:
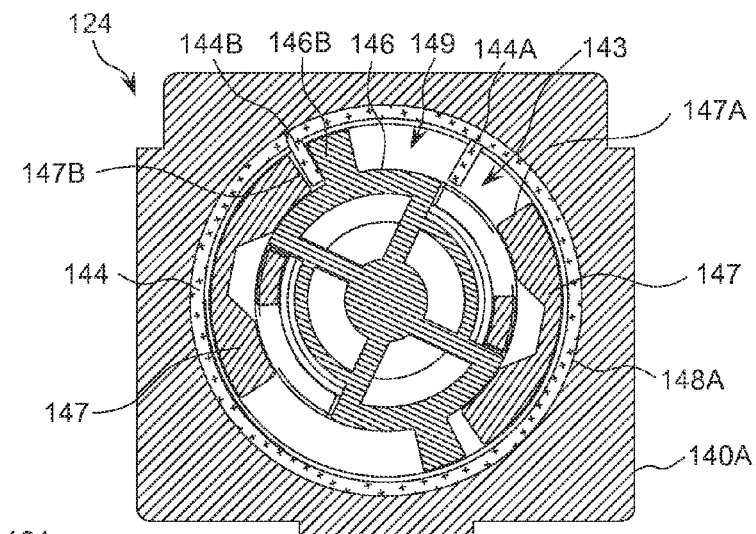
FIG. 7 is a schematic view illustrating an arrester of the actuating system in a locking state.

In conjunction with FIGS. 4-6, FIGS. 7-9 are schematic views illustrating exemplary operation of the arrester 124. In FIG. 7, the arrester 124 is exemplary illustrated in a locking state, and no manual pulling action is applied on the pull member 120. In this state, a vertical weight exerted by the bottom part 106 on the suspension members 112 can result in the application of a torque that rotationally biases the collar 142 in a direction to urge one of the two flange surfaces 147A and 147B (e.g., the flange surface 147B) against one of the two prongs 144A and 144B (e.g., the prong 144B). This pushing force is in a direction that biases the prongs 144A and 144B toward each other (i.e., in a direction narrowing the space 149), which urges the springs 144 to enlarge and frictionally contact with the inner sidewall 148A of the cavity 148. The frictional contact between the outer circumference of each spring 144 with the inner sidewall 148A can counteract the torque induced by the suspended weight, and prevent rotation of the springs 144, the collar 142 and the transmission axle 114 affixed with the collar 142 in a direction of lowering the bottom part 106. The bottom part 106 can be thereby kept stationary at a desired height.

For turning the arrester 124 from the locking state to a release state, the actuating part 146 can be driven in rotation so as to cause the rib 146B to push against either of the two prongs 144A and 144B (i.e., in a direction for enlarging the space 149), which causes the springs 144 to contract and loosen the frictional contact with the inner sidewall 148A of the cavity 148. The contracted springs 144 then can be urged in rotation by the rib 146B of the actuating part 146, and either of the two prongs 144A and 144B can in turn push against either of the flange surfaces 147A and 147B of the collar 142 to drive rotation of the collar 142 and transmission axle 114 for raising or lowering the bottom part 106.

Figure 8:
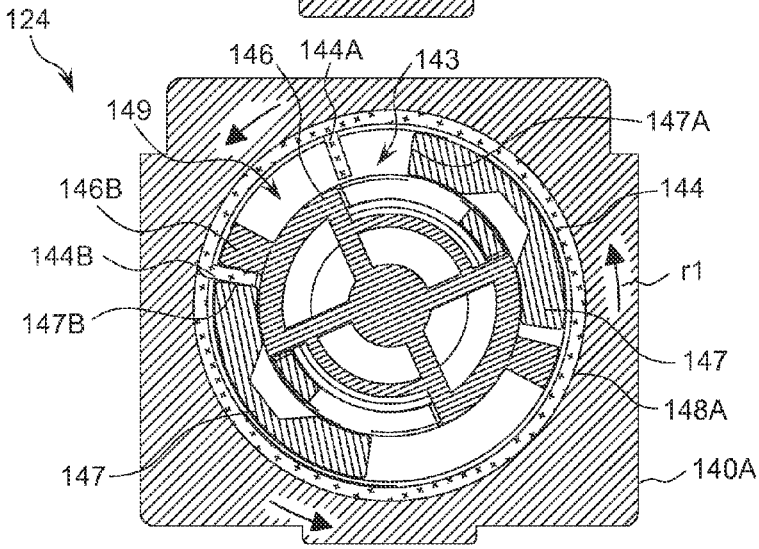
FIG. 8 is a schematic view illustrating the arrester of the actuating system turned to a release state for raising a bottom part of the window shade.

Referring to FIG. 8, when the actuating part 146 exemplary rotates in a direction r1 for raising the bottom part 106, the rib 146B can exemplary push against the prong 144B to contract each spring 144 and urge rotation of the spring 144 in the same direction r1. As the contracted springs 144 rotate synchronously with the actuating part 146, the prongs 144B of the springs 144 can in turn push against the flange surface 147B of the collar 142, which causes rotation of the collar 142 and the transmission axle 114 in the same direction r1 to raise the bottom part 106.

Figure 9:
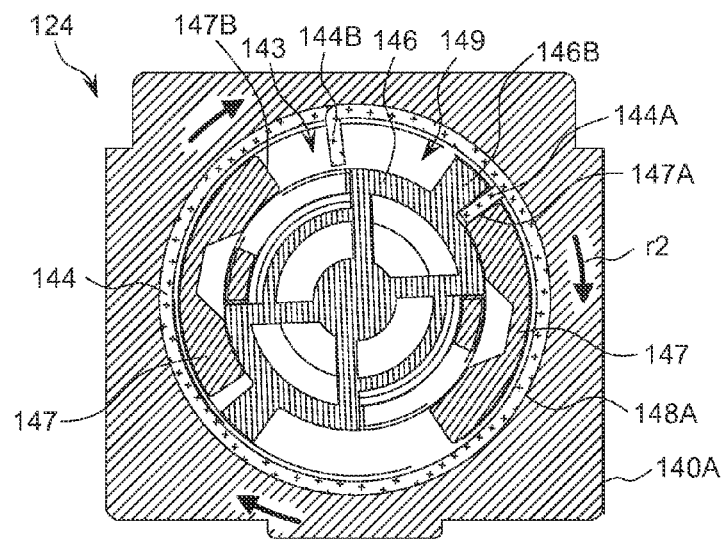
FIG. 9 is a schematic view illustrating the arrester of the actuating system turned to a release state for lowering a bottom part of the window shade.
Figure 10:
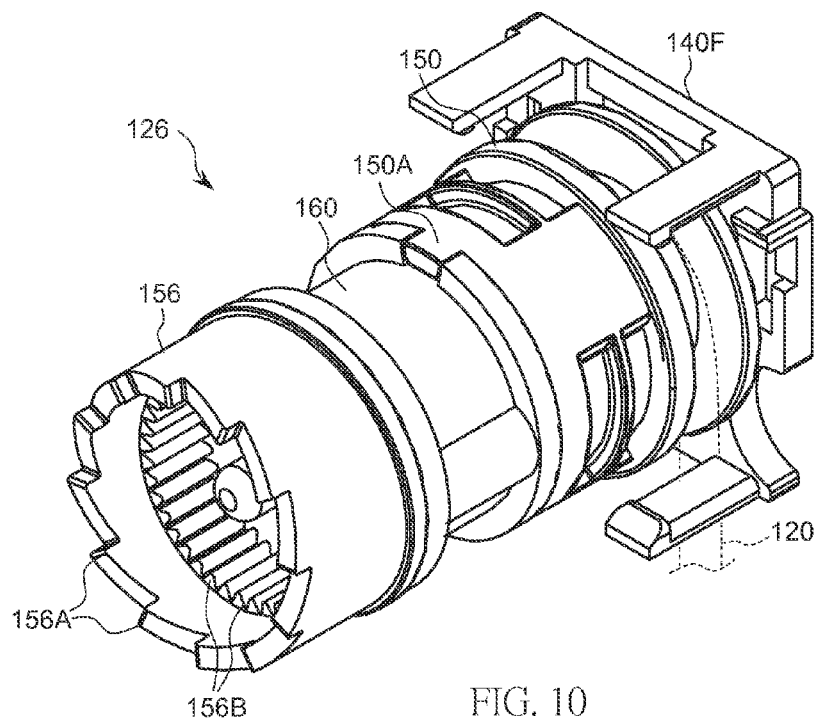
FIG. 10 is a perspective view illustrating a construction of a driving unit incorporated in the control module shown in FIG. 4.
Figure 11:
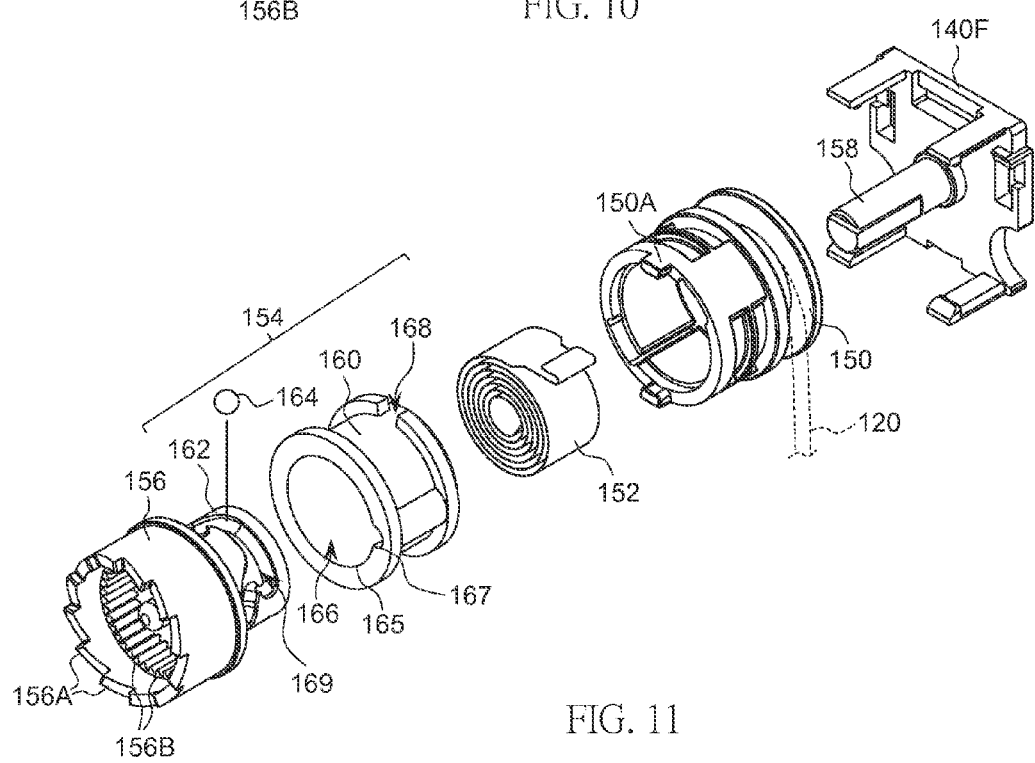
FIG. 11 is an exploded view illustrating the construction of the driving unit shown in FIG. 10.

Referring to FIG. 9, when the actuating part 146 rotates in a direction r2 opposite to r1 for lowering the bottom part 106, the rib 146B can push against the prong 144A to contract each spring 144 and urge rotation of the spring 144 in the same direction r2. As the contracted springs 144 rotate synchronously with the actuating part 146, the prongs 144A of the springs 144 can then push against the flange surface 147A of the collar 142, which causes rotation of the collar 142 and the transmission axle 114 in the same direction r2 to lower the bottom part 106.

In conjunction with FIGS. 4-6, FIGS. 10 and 11 are respectively perspective and exploded views illustrating a construction of the driving unit 126. Referring to FIGS. 4-6, 10 and 11, the driving unit 126 can include the pull member 120 described previously, a spool 150 to which the pull member 120 is connected, a spring 152, a unidirectional coupling device 154 and a ring 156. The spool 150 can be pivotally connected with a fixed shaft 158 that is fixedly connected with the end cap 140F. The fixed shaft 158 can be coaxial to the transmission axle 114, and can define the pivot axis of the spool 150. A tab 150A may be provided on the spool 150 at a location radially offset from its pivot axis. The spool 150 can be affixed with an end of the pull member 120, which can extend outside the casing 140 of the control module 116.

The spring 152 can be a spiral torsion spring arranged in an inner cavity of the spool 150, and can have an inner end connected with the fixed shaft 158 and an outer end connected with the spool 150. A washer 159 (better shown in FIG. 5) can be assembled about the fixed shaft 158 to retain the spring 152 in the interior of the spool 150. The spring 152 can bias the spool 150 to rotate for winding the pull member 120.

The unidirectional coupling device 154 can include a sleeve 160, a drum 162 and a ball 164. The sleeve 160 can be pivotally connected with the fixed shaft 158 adjacent to the spool 150. The sleeve 160 can have an inner cylindrical sidewall 165 that defines an inner cavity 166 and is formed with a slot 167 extending parallel to the axis of the fixed shaft 158. A periphery of the sleeve 160 can have a notch 168 in which is engaged the tab 150A of the spool 150, whereby the sleeve 160 and the spool 150 can be rotationally coupled with each other in two directions of rotation.

The drum 162 can have an outer surface provided with a closed guide track 169 that circumferentially runs around the drum 162. The drum 162 can be pivotally connected through the inner cavity 166 of the sleeve 160 about an axis that is coaxial to the fixed shaft 158. When the drum 162 is assembled with the sleeve 160, the slot 167 overlaps partially with the guide track 169, and the ball 164 can be movably arranged in the slot 167 and the guide track 169.

The ring 156 can be coaxially affixed with the drum 162, such that the ring 156 and the drum 162 are rotatable in unison about the same axis defined by the fixed shaft 158. In one embodiment, the ring 156 can be affixed with the drum 162. A circular rim of the ring 156 at a side opposite to that of the drum 162 can be formed with a plurality of teeth 156A protruding axially. Moreover, the ring 156 can have an internal surface provided with a plurality of inner teeth 156B projecting inward.

Figure 12:
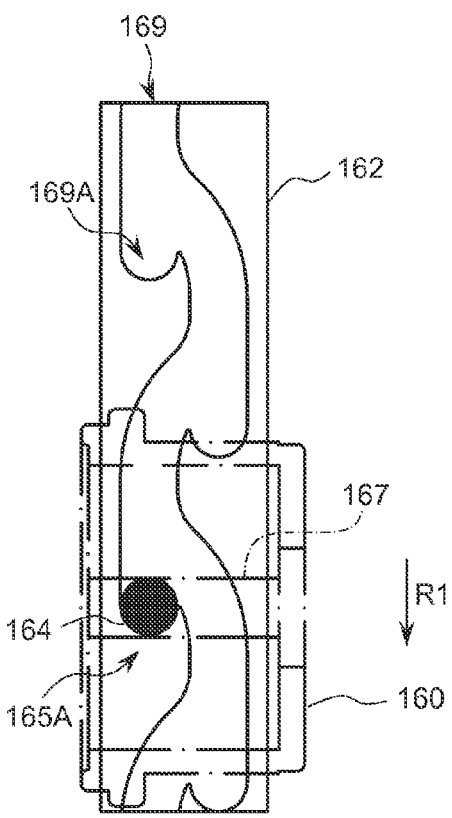
FIGS. 12 and 13 are schematic views illustrating the interaction between a sleeve, a drum and ball in the driving unit shown in FIG. 10.
Figure 13:
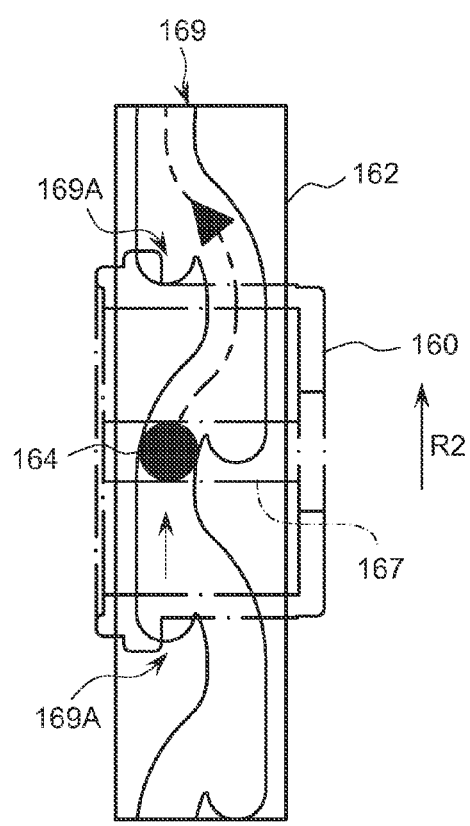

FIGS. 12 and 13 are schematic views illustrating the interaction between the sleeve 160, the drum 162 and the ball 164. The guide track 169 is represented in a planar projection in FIGS. 12 and 13. The guide track 169 can include a plurality of recessed stop regions 169A distributed around the drum 162. Referring to FIG. 12, when the sleeve 160 and the spool 150 rotate in unison in a first direction R1 for unwinding the pull member 120, the ball 164 can displace along the slot 167 and the guide track 169 until it engages with one of the stop regions 169A, whereby the rotational displacement of the spool 150 can be transmitted through the sleeve 160, the ball 164 and the drum 162 to the ring 156. In other words, a downward pulling action applied on the pull member 120 always drives the spool 150 and the ring 156 to rotate in the same direction R1.

Referring to FIG. 13, when the pull member 120 is released after it is extended downward, the spring 152 can urge the spool 150 to rotate in a second direction R2 opposite to R1 for winding the pull member 120. As the spool 150 and the sleeve 160 rotate in unison in the second direction, the ball 164 can be driven to leave the stop region 169A and move continuously along the guide track 169 of the drum 162 without being obstructed. While the spool 150 and the sleeve 160 rotate in unison for winding the pull member 120, the drum 162 and the ring 156 remain stationary.

Referring to FIGS. 4-13, the stop member 128, the central gear 130, the carrier 132, the planetary gears 134 and the switch member 136 are arranged to form a drive transmission assembly that is selectively operable in two modes of transmission for transmitting a rotational output from the driving unit 126 to the transmission axle 114. More specifically, when a first mode of transmission is selected, the rotational displacement of the ring 156 and the spool 150 of the driving unit 126 in the first direction R1 (i.e., occurring when the pull member 120 is pulled downward) can drive a rotational displacement of the actuating part 146 and the transmission axle 114 in the second direction r2 (i.e., opposite to the first direction R1) for lowering the bottom part 106. When a second mode of transmission is selected, the rotational displacement of the ring 156 and the spool 150 of the driving unit 126 in the first direction R1 can drive a rotational displacement of the actuating part 146 and the transmission axle 114 in the first direction r1 (the directions R1 and r1 are identical) for raising the bottom part 106. The switch member 136 is movable between a first position (corresponding to the first mode of transmission) and a second position (corresponding to the second mode of transmission) to selectively enable either of the first and second mode of transmission described previously.

Figure 14:
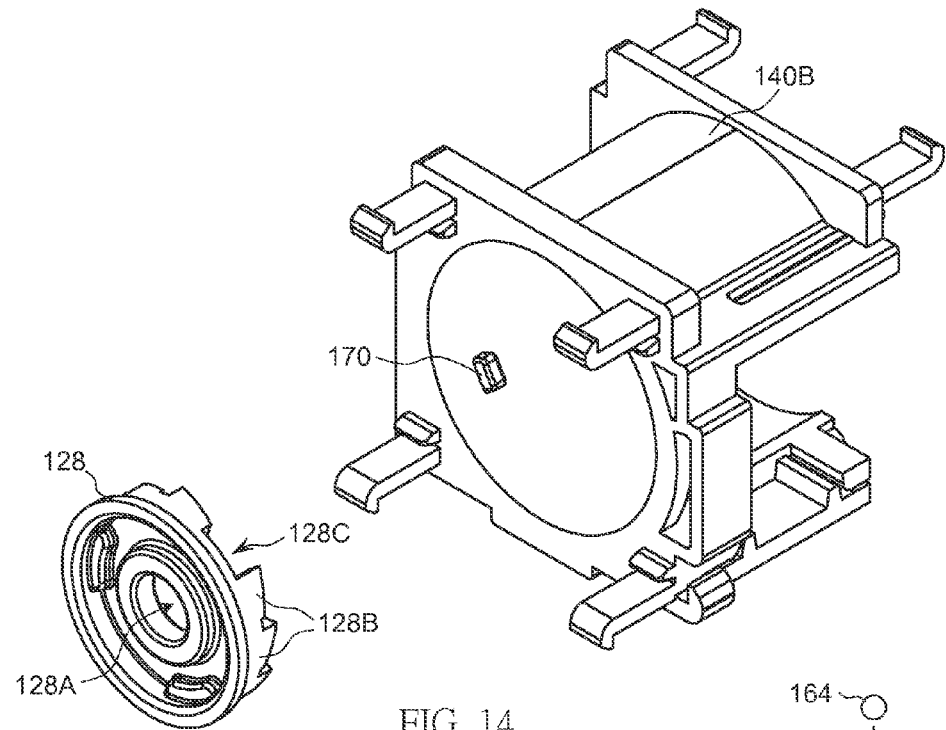
FIG. 14 is a schematic view illustrating the assembly of a stop member with a housing portion in the control module shown in FIG. 4.
Figure 15:
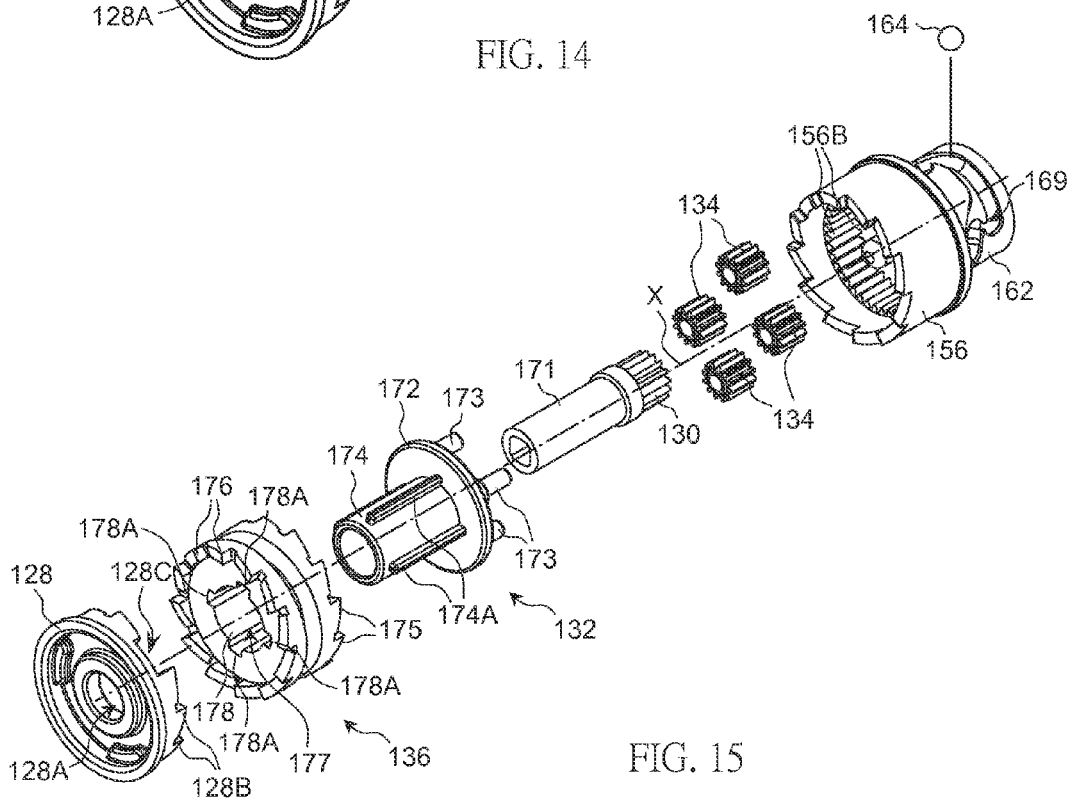
FIG. 15 is a schematic view illustrating the connection of a switch member with a carrier in the control module shown in FIG. 4.
Figure 16:
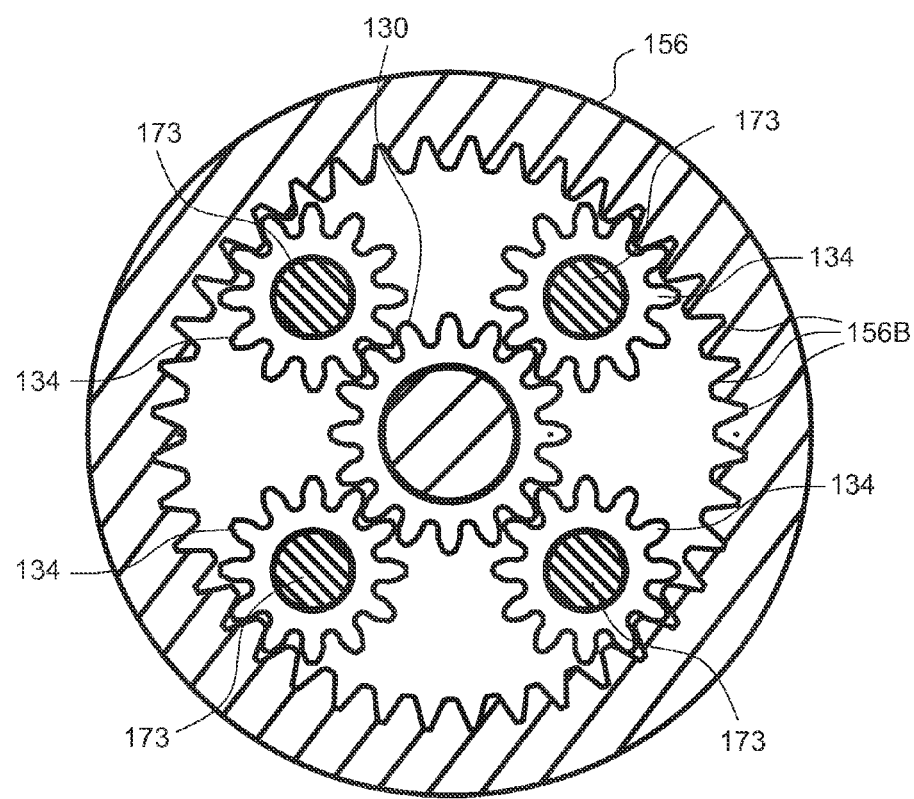
FIG. 16 is a schematic view illustrating the connection of planetary gears with a central gear and a ring in the control module shown in FIG. 4.

In conjunction with FIGS. 4-6, FIG. 14 is a schematic view illustrating the assembly of the stop member 128 with the housing portion 140B of the casing 140, FIG. 15 is a schematic view illustrating the arrangement of the switch member 136, the carrier 132, the planetary gears 134 and the central gear 130 of the drive transmission assembly, and FIG. 16 is a schematic view illustrating the connection of the planetary gears 134 with the central gear 130 and the ring 156. All of the stop member 128, the central gear 130, the carrier 132, the switch member 136 and the ring 156 are disposed substantially coaxial with respect to the longitudinal axis X of the transmission axle 114.

Referring to FIG. 14, the stop member 128 can be exemplary formed as a disk that has an axis aligned with the fixed shaft 158. The stop member 128 can have a central hole 128A, and a plurality of teeth 128B that are located around the central hole 128A and project toward the switch member 136. An outer peripheral surface of the stop member 128 can further have one or more slot 128C. When the stop member 128 is arranged in the housing portion 140B, one or more stud 170 protruding inward from an inner surface of the housing portion 140B can respectively fit into the slots 128C so as to block rotation of the stop member 128 relative to the casing 140. The stop member 128 is thereby fixed at a location axially spaced apart from the ring 156. Moreover, the shaft portion 146A of the actuating part 146 can loosely extend through the central hole 128A such that the actuating part 146 is rotatable relative to the stop member 128.

Referring to FIGS. 4-6 and 15, the central gear 130 can be affixed with a shaft portion 171. In one embodiment, the central gear 130 and the shaft portion 171 may be formed as an integral part. The central gear 130 can be connected to the actuating part 146 by fitting the shaft portion 146A of the actuating portion 146 into the shaft portion 171, whereby the central gear 130 and the actuating part 146 are rotationally coupled with each other. Because the actuating part 146 and the transmission axle 114 are affixed with each other, the central gear 130 is thus also rotationally coupled with the transmission axle 114 through its connection with the actuating part 146.

Referring to FIG. 15, the carrier 132 can be formed as an integral part including an annular portion 172 centered about the axis of the fixed shaft 158, a plurality of shaft portions 173 projecting from a first side of the annular portion 172, and a sleeve portion 174 projecting from a second side of the annular portion 172 opposite to that of the shaft portions 173. An outer surface of the sleeve portion 174 can be provided with a plurality of projecting ribs 174A disposed circumferentially around the sleeve portion 174. The carrier 132 can be pivotally assembled around the shaft portion 171, and the shaft portion 171 can extend axially through the annular portion 172 and the sleeve portion 174 of the carrier 132 to affix with the shaft portion 146A of the actuating part 146, the central gear 130 being located at the first side of the annular portion 172. Relative rotation is thus allowed between the carrier 132 and the assembly of the central gear 130 and the actuating part 146.

The switch member 136 can be pivotally assembled in a region between the ring 156 and the stop member 128. The switch member 136 can have a plurality of teeth 175 and 176 respectively projecting in two opposite directions, the teeth 175 projecting toward the ring 156, and the teeth 176 projecting toward the stop member 128. The teeth 175 and 176 can be respectively distributed along two circles of equal or different diameters that are centered on the longitudinal axis X. Moreover, the switch member 136 can have a central hole 177 delimited by a cylindrical inner sidewall 178. The inner sidewall 178 can include a plurality of slits 178A angularly spaced apart from one another and extending parallel to the longitudinal axis X. The switch member 136 can be connected with the carrier 132 with the sleeve portion 174 of the carrier 132 arranged through the central hole 177, the ribs 174A of the sleeve portion 174 being respectively received in the slits 178A of the switch member 136. The switch member 136 is thereby rotationally coupled with the carrier 132, but can slide on the sleeve portion 174 relative to the carrier 132. In particular, the switch member 136 can slide along the longitudinal axis X relative to the carrier 132 to selectively engage either the teeth 175 with the teeth 156A of the ring 156, or the teeth 176 with the teeth 128B of the stop member 128.

Referring to FIGS. 4-6, 15 and 16, the planetary gears 134 are pivotally connected with the shaft portions 173 of the carrier 132 around the central gear 130, and are positioned inside the ring 156. The planetary gears 134 are respectively meshed with the central gear 130 and the inner teeth 156B of the ring 156, the ring 156 surrounding the planetary gears 134.

Figure 17:
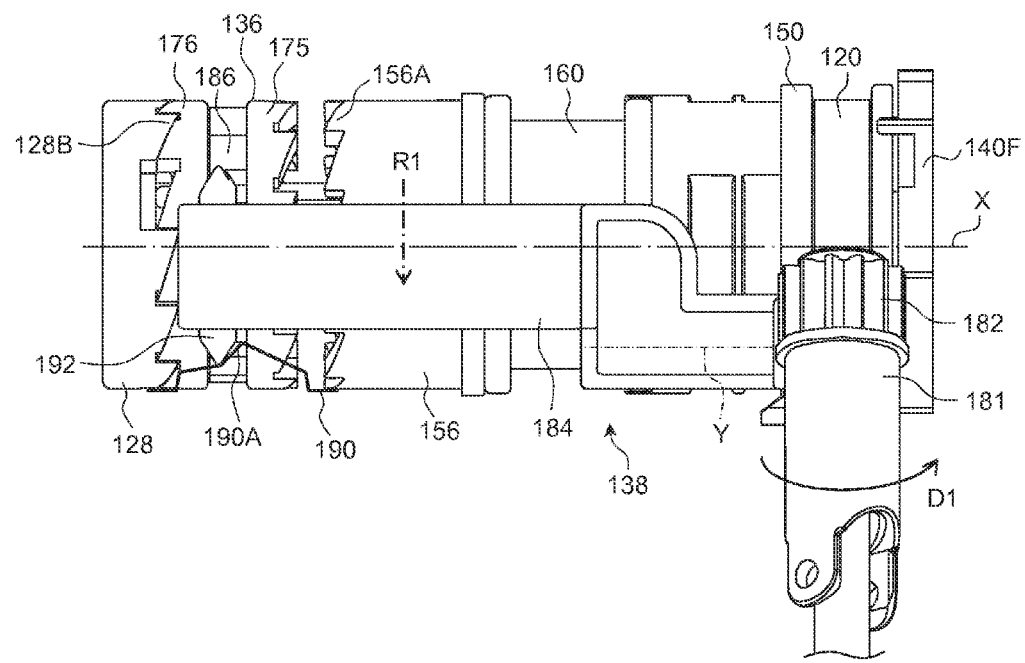
FIG. 17 is a schematic view illustrating the control module in a first driving mode of operation by having a switch member engaged with a stop member.
Figure 18:
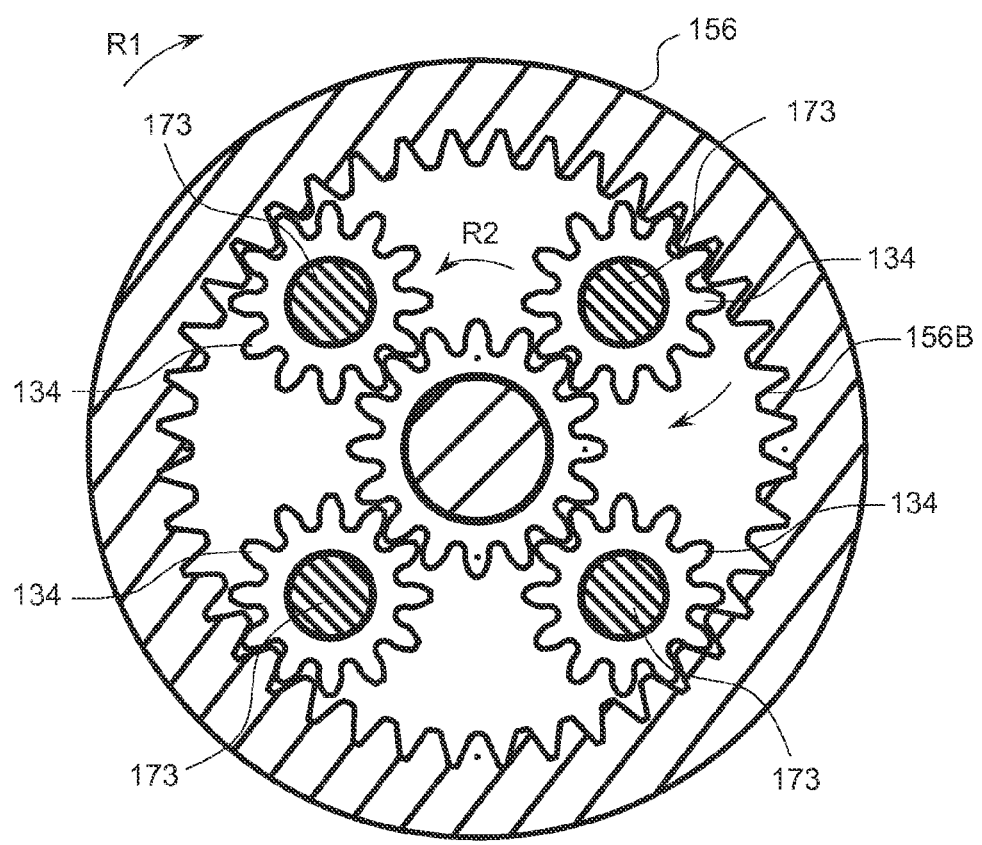
FIG. 18 is a schematic view illustrating exemplary rotational displacement that can occur in the control module while the switch member is engaged with the stop member.

In conjunction with FIGS. 4-16, FIGS. 17-20 are schematic views illustrating exemplary operation of the control module 116. In FIG. 17, the switch member 136 is shown in a first position engaged with the stop member 128 (i.e., the teeth 176 and 128B are engaged with each other) and disengaged from the ring 156. While the control module 116 is in this configuration, the pull member 120 can be pulled downward to cause rotation of the spool 150 and the ring 156 in the direction R1. Because the switch member 136 is engaged with the stop member 128, rotation of the switch member 136 and the carrier 132 in the direction R1 is blocked. Accordingly, the switch member 136 and the carrier 132 remain stationary, and the rotation of the ring 156 can drive rotation of the planetary gears 134 about their respective shaft portion 173, which in turn can drive the central gear 130, and the actuating part 146 and the transmission axle 114 rotationally coupled therewith, to rotate about the longitudinal axis X in the direction R2 opposite to R1 through the meshing engagement between the planetary gears 134 and the central gear 130. This is schematically shown in FIG. 18.

The engagement of the switch member 136 with the stop member 128 can exemplary set the first mode of transmission for lowering the window shade 100, i.e., the pull member 120 is pulled downward to drive rotation of the central gear 130, the actuating part 146 and the transmission axle 114 in the aforementioned direction R2 to cause unwinding of the suspension members 112 from the winding units 110 for lowering the bottom part 106. As shown in FIG. 9, the rib 146B of the actuating part 146 can accordingly push against the prong 144A to contract each spring 144 and urge rotation of the spring 144 in the same direction. As the contracted springs 144 rotate with the actuating part 146, the prongs 144A of the springs 144 can in turn push against the flange surface 147A of the collar 142, which causes rotation of the collar 142 and the transmission axle 114 to lower the bottom part 106.

Figure 19:
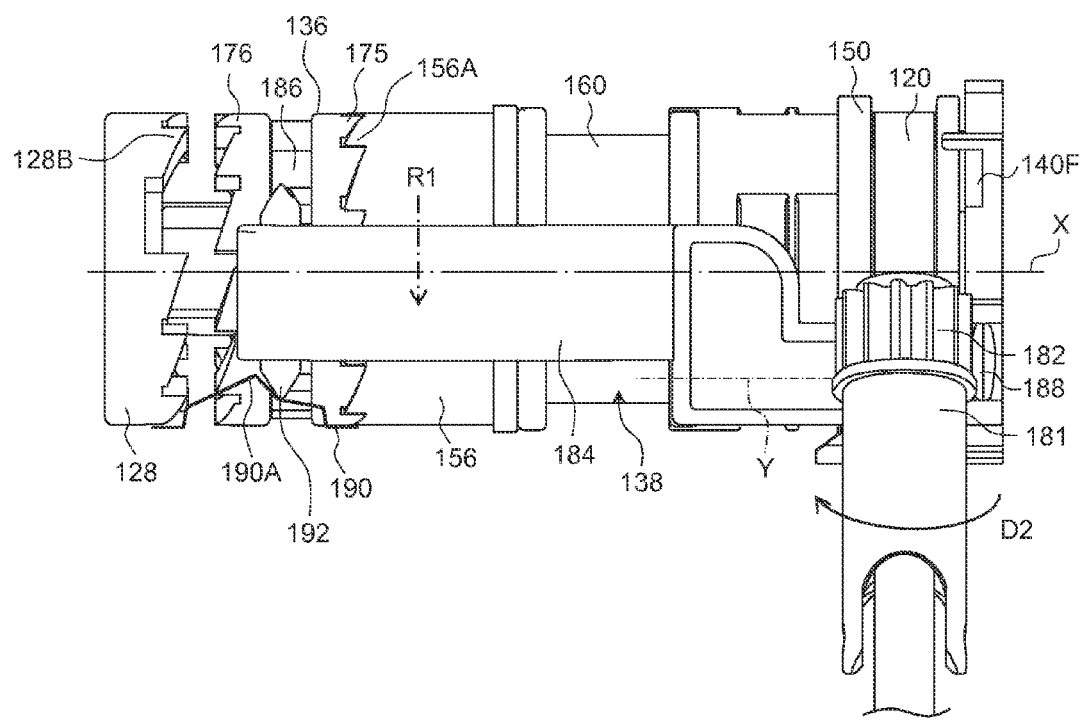
FIG. 19 is a schematic view illustrating the control module in a second driving mode of operation by having the switch member engaged with a ring.
Figure 20:
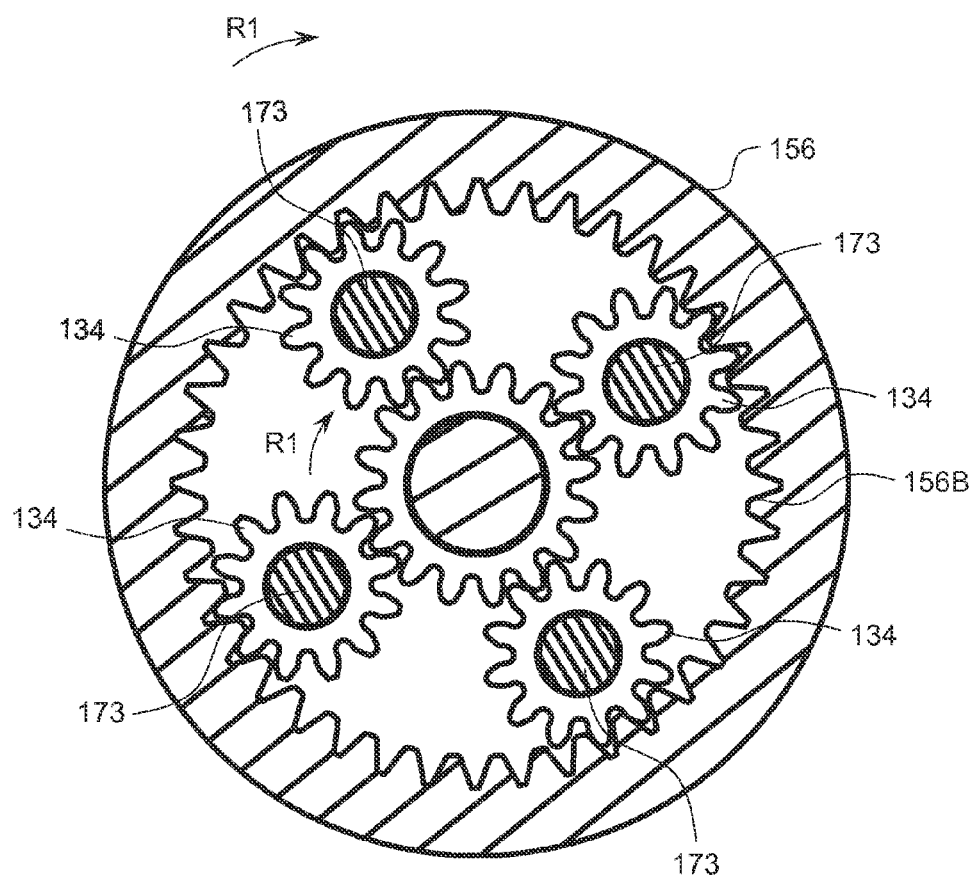
FIG. 20 is a schematic view illustrating exemplary rotational displacement that can occur in the control module while the switch member is engaged with the ring.

In FIG. 19, the switch member 136 is shown in a second position engaged with the ring 156 (i.e., the teeth 175 and 156A are engaged with each other) and disengaged from the stop member 128. While the control module 116 is in this configuration, the pull member 120 can be pulled downward to cause rotation of the spool 150 and the ring 156 in the same direction R1. Owing to the engagement between the switch member 136 and the ring 156, this rotation of the ring 156 can drive the switch member 136, the carrier 132, and the planetary gears 134 supported by the carrier 132 to rotate in unison about the longitudinal axis X in the same direction R1. While they rotate about the longitudinal axis X, the planetary gears 134 remain substantially stationary relative to the carrier 132. Owing to the meshing engagement between the central gear 130 and the planetary gears 134, the central gear 130, the actuating part 146 and the transmission axle 114 also rotate in unison about the longitudinal axis X in the same direction R1, which is schematically shown in FIGS. 19 and 20.

The engagement of the switch member 136 with the ring 156 can exemplary set the second mode of transmission for raising the window shade 100, i.e., the pull member 120 is pulled downward to drive rotation of the central gear 130, the actuating part 146 and the transmission axle 114 in the aforementioned direction R1 to cause winding of the suspension members 112 in the winding units 110 for raising the bottom part 106. As shown in FIG. 8, the rib 146B of the actuating part 146 thus can push against the prong 144B to contract each spring 144 and urge rotation of the spring 144 in the same direction. As the contracted springs 144 rotate with the actuating part 146, the prongs 144B of the springs 144 can in turn push against the flange surface 147B of the collar 142, which causes rotation of the collar 142 and the transmission axle 114 to raise the bottom part 106.

Owing to the engaging configuration of the ring 156, the planetary gears 134 and the central gear 130, for a given extension of the pull member 120, the number of revolutions performed by each winding unit 110 is greater than the number of revolutions performed by the spool 150 in the first mode of transmission for lowering the window shade 100. In contrast, when the actuating system 108 is in the second mode of transmission for raising the window shade 100, the number of revolutions performed by each winding unit 110 is equal to the number of revolutions performed by the spool 150. In other words, for a same extension of the pull member 120, the resulting vertical course of the bottom part 106 is greater in the first mode of transmission for lowering the window shade 100 than in the second mode of transmission for raising the window shade 100.

Referring to FIGS. 7-9 and 13, when the pull member 120 is released after it is extended downward (e.g., in the upward or downward driving mode), the spring 152 can urge the spool 150 to rotate for winding the pull member 120, whereas the drum 162, the ring 156 and the switch member 136 remain stationary. While the spool 150 is winding the pull member 120 and the ring 156 remains stationary, the suspended weight of the bottom part 106 can bias the transmission axle 114 in a direction that causes either of the two flange surfaces 147A and 147B of the collar 142 to push against the corresponding prongs 144A or 144B for enlarging the springs 144. The enlarged springs 144 can thereby frictionally contact with the inner sidewall 148A of the cavity 148 to prevent rotation of the transmission axle 114 in the direction for lowering the bottom part 106.

Referring again to FIGS. 4-6, the switch member 136 can be operatively connected with the rod assembly 118 via the switch actuating mechanism 138. Upon manual rotation of the rod assembly 118, the switch actuating mechanism 138 can operate to displace the switch member 136 between the two functional positions respectively engaged with the stop member 128 and the ring 156 as shown in FIGS. 17 and 19.

The rod assembly 118 can include a wand 180 and a joint part 181. As better shown in FIGS. 1, 3 and 5, the wand 180 can have an elongated shape extending substantially vertical at a front of the window shade 100. The joint part 181 can be pivotally assembled with the casing 140 near an end of the head rail 102, and can be affixed with a gear 182. The wand 180 can have an elongated shape extending along a lengthwise axis W. An upper end of the wand 180 is pivotally connected with the joint part 181, such that the wand 180 can be tilted relative to a vertical direction to facilitate grasping and manual operation. The wand 180 and the joint part 181 can have a hollow interior for passage of the pull member 120.

Referring to FIGS. 5, 6, 17 and 19, the switch actuating mechanism 138 can include an arm 184 that is disposed offset from the longitudinal axis X of the transmission axle 114. The arm 184 can be arranged for sliding movement along a displacement axis Y substantially parallel to the longitudinal axis X of the transmission axle 114. The arm 184 can have a first end provided with a bracket 186, and a second end opposite to the first end affixed with a toothed portion 188. The bracket 186 can have a C-shape, and pivotally support the switch member 136. The toothed portion 188 meshes with the gear 182 at the top of the rod assembly 118, so that rotation of the rod assembly 118 can drive the arm 184 and the switch member 136 to slide in unison along the displacement axis Y. Accordingly, the rod assembly 118 is rotationally operable to selectively displace the switch member 136 between the two functional positions described previously, i.e., the first position engaged with the stop member 128, and the second position engaged with the ring 156. For example, a rotation of the rod assembly 118 in a first switching direction D1 can result in a sliding movement of the arm 184 that displaces the switch member 136 to the first position engaged with the stop member 128, and a rotation of the rod assembly 118 in a second switching direction D2 opposite to the first switching direction D1 can result in a sliding movement of the arm 184 in an opposite direction that displaces the switch member 136 to the second position engaged with the ring 156.

Referring to FIGS. 5, 17 and 19, for retaining the switch member 136 at any of the aforementioned first and second positions, the switch actuating mechanism 138 can further include a detent 190 that is affixed with a housing portion of the control module 116, e.g., the housing portion 140B. In one embodiment, the detent 190 can be formed as a resilient part having a protrusion 190A. The arm 184, which is arranged through the housing portion 140B, is affixed with a protrusion 192 that can abut against the protrusion 190A of the detent 190 to hold the arm 184 and the switch member 136 at any of the first and second positions. For example, with reference to FIGS. 17 and 19, the protrusion 192 on the arm 184 can abut against a left side of the protrusion 190A of the detent 190 to retain the switch member 136 in the first position engaged with the stop member 128 (as shown in FIG. 17), and a right side of the protrusion 190A of the detent 190 to retain the switch member 136 in the second position engaged with the ring 156 (as shown in FIG. 19). When the rod assembly 118 is rotated in either of the two switching directions D1 and D2, the sliding arm 184 can push against the protrusion 190A of the detent 190 to cause its elastic deformation, thereby allowing passage of the protrusion 192 for switching between the first and second position of the switch member 136.

Figure 21:
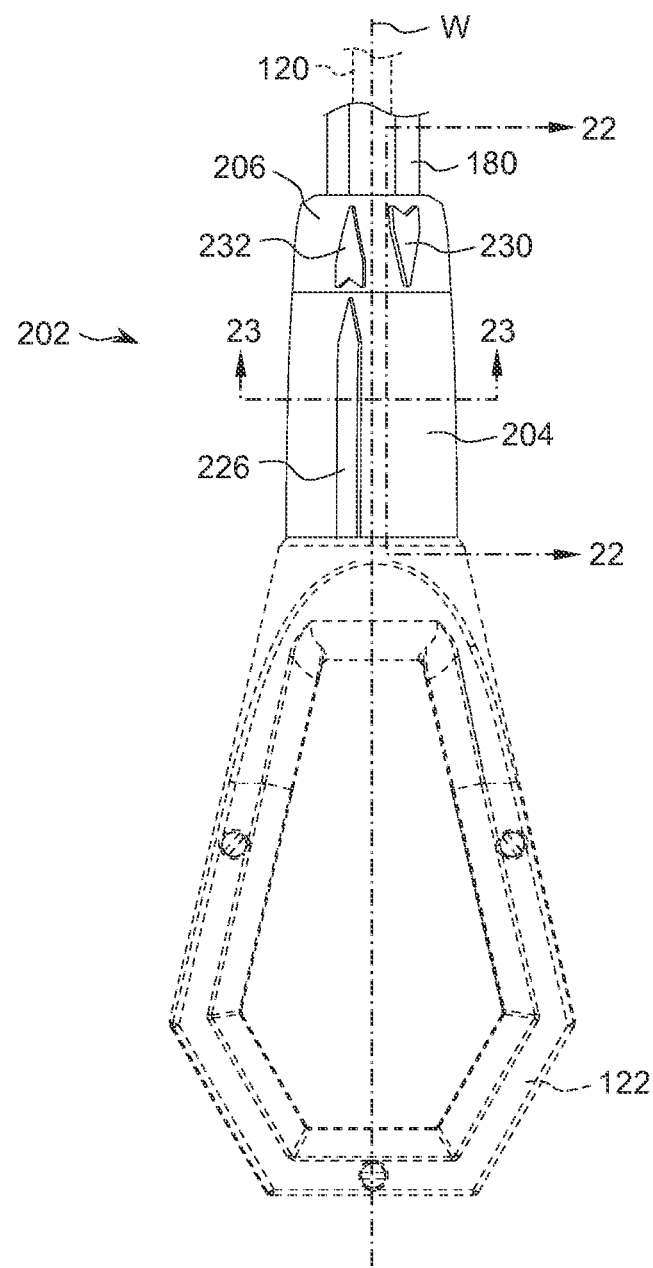
FIG. 21 is an enlarged view illustrating an indicator mechanism provided on a rod assembly of a window shade.

In one embodiment, some visual indicator may be provided so as to visually associate each switching direction of the rod assembly 118 with a corresponding vertical displacement of the shading structure 104. FIGS. 21-32 are schematic views illustrating an indicator mechanism 202 provided at a lower end of the rod assembly 118 for this purpose. Referring to FIG. 21, the indicator mechanism 202 can include a rotary part 204 that is pivotally connected with the wand 180. For example, the lower end of the wand 180 can be affixed with an end connector 206, and the rotary part 204 can be pivotally connected with the end connector 206. This connection allows the rotary part 204 to rotate relative to the wand 180 about its lengthwise axis W. Exemplary construction for assembling the wand 180 and the rotary part 204 with the end connector 206 is illustrated with more details in FIGS. 22-24.

Figure 22:
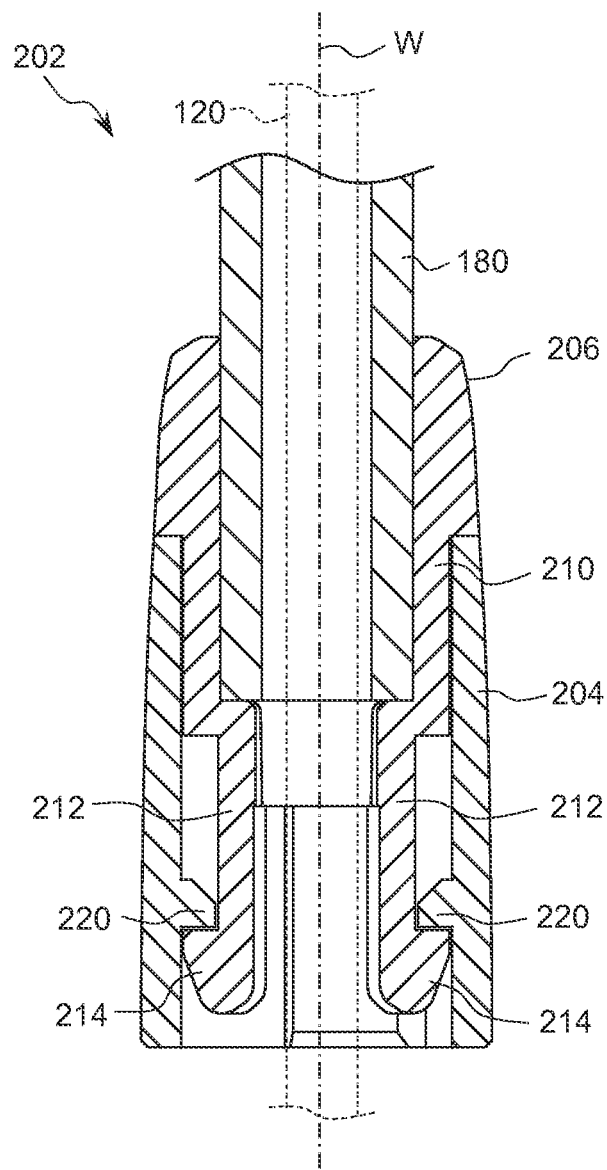
FIG. 22 is a cross-sectional view taken along section 22-22 shown in FIG. 21.
Figure 23:
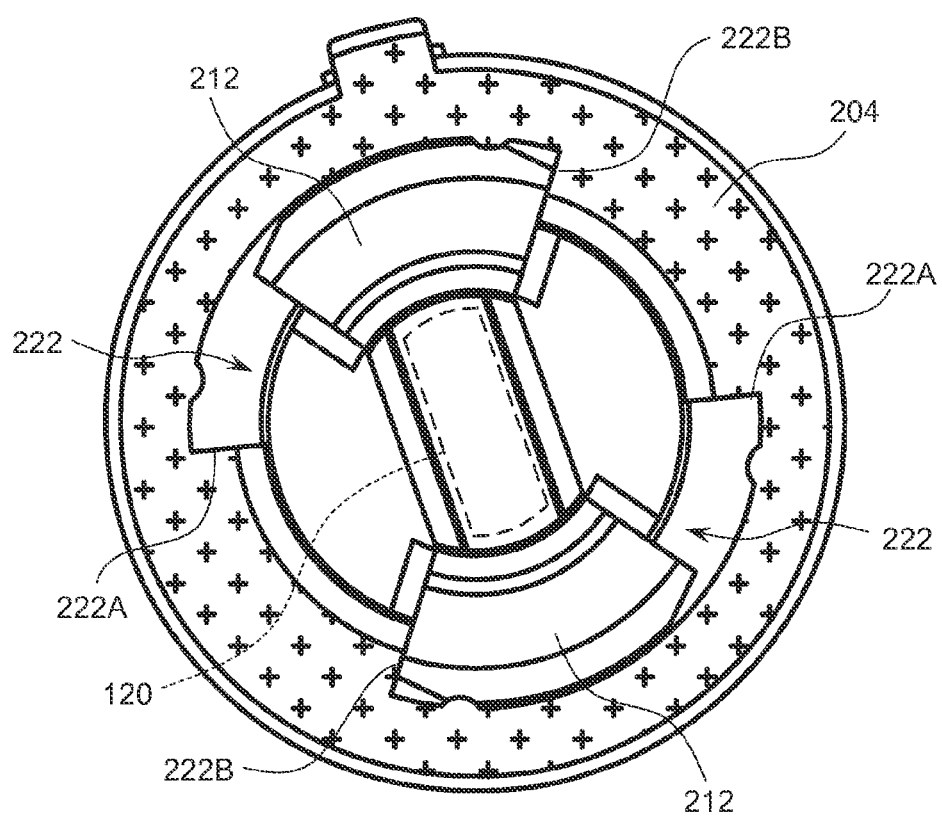
FIG. 23 is a cross-sectional view taken along section 23-23 shown in FIG. 21.
Figure 24:
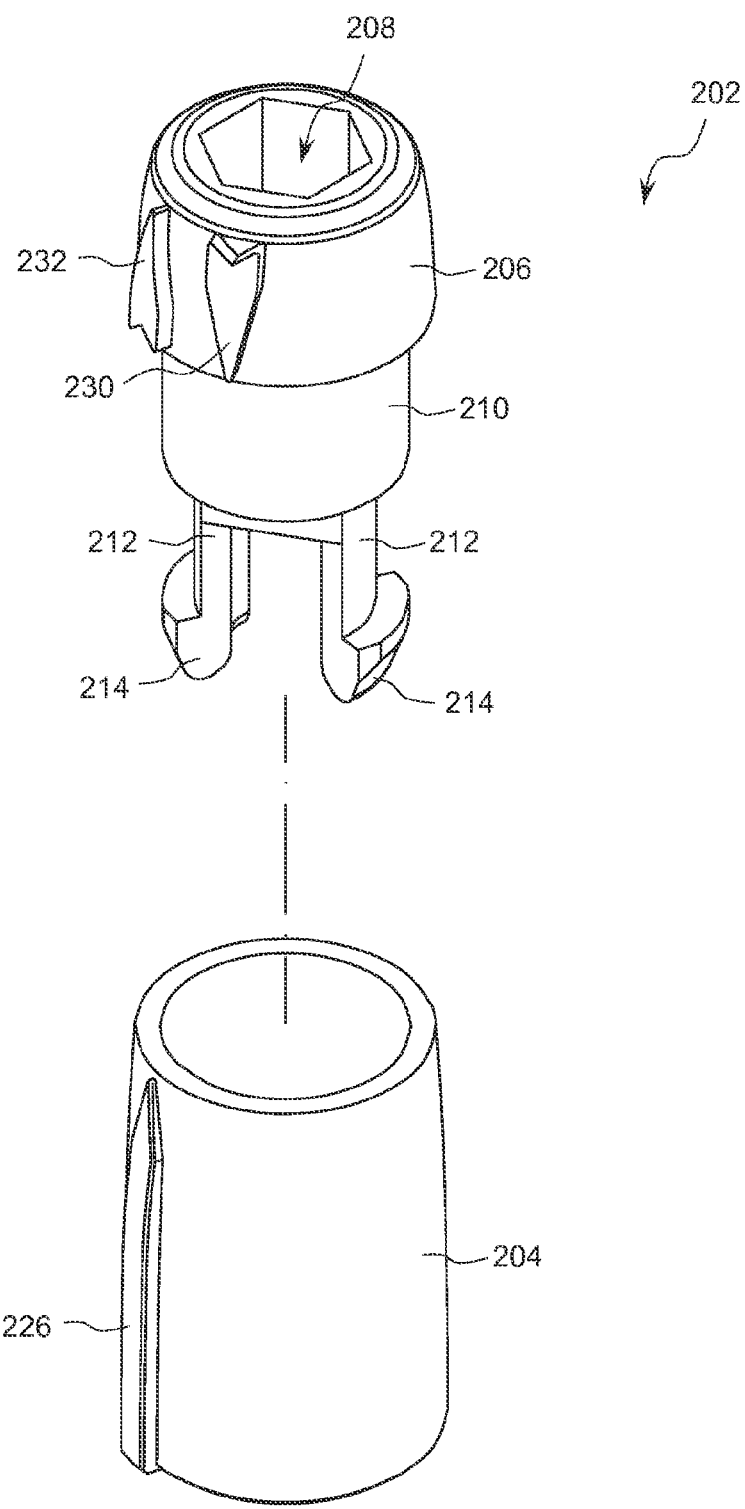
FIG. 24 is an exploded view of the indicator mechanism shown in FIG. 21.

FIG. 22 is a cross-sectional view taken along section 22-22 shown in FIG. 21, FIG. 23 is a cross-sectional view taken along section 23-23 shown in FIG. 21, and FIG. 24 is an exploded view of the indicator mechanism 202. For clarity, a portion of the pull member 120 passing through the interior of the rotary part 204 and the end connector 206 is shown with phantom lines in the representation of FIGS. 22 and 23. Referring to FIGS. 22-24, the end connector 206 can have a round shape with a hollow interior. Structural features of the end connector 206 include an opening 208, a shaft portion 210 and a plurality of resilient prongs 212. The opening 208 may have a shape adapted to receive the lower end of the wand 180 to fixedly secure the end connector 206 with the wand 180. The resilient prongs 212 extend at a lower side of the shaft portion 210, each of the resilient prongs 212 having a rib 214 protruding outward. In one embodiment, the end connector 206 including the shaft portion 210 and the resilient prongs 212 can be formed as an integral part.

The rotary part 204 can have a hollow interior in which are provided a plurality of protrusions 220. The shaft portion 210 of the end connector 206 can be arranged through the interior of the rotary part 204 to pivotally assemble the rotary part 204 with the end connector 206, and the resilient prongs 212 can deflect outward to respectively engage with an underside of the protrusions 220 to hold the rotary part 204 with the end connector 206. A portion of the pull member 120 can be arranged through the respective hollow interior of the wand 180, the rotary part 204 and the end connector 206, the handle 122 affixed with the pull member 120 being positionable adjacent to the rotary part 204.

Referring to FIG. 23, the interior of the rotary part 204 can include one or more slot 222 respectively associated with one or more of the resilient prong 212, the resilient prong 212 moving along the corresponding slot 222 when the rotary part 204 rotates about the lengthwise axis W relative to the wand 180. The slot 222 can have two opposite end edges 222A and 222B that limit the range of displacement of the resilient prong 212 in the slot 222. The rotary part 204 is thereby restricted to rotate within an angular range defined between a first and a second angular position respectively defined by the end edge 222A and 222B. Some structural feature may be further provided to prevent inadvertent rotation of the rotary part 204 between the aforementioned first and second angular position. For example, a frictional contact cam be realized between the inner sidewall of the slot 222 and the resilient prong 212 so that the rotary part 204 cannot easily rotate between the first and second angular position without voluntarily action by a user.

As shown in FIG. 21, markings can be provided on the rod assembly 118 to visually indicate the aforementioned two angular positions of the rotary part 204 with respect to the wand 180. For example, a pointer 226 can be provided on the rotary part 204, and a downward mark 230 and an upward mark 232 spaced apart from each other can be provided on the end connector 206 of the wand 180. The first angular position of the rotary part 204 corresponding to the abutment of the resilient prong 212 with the end edge 222A of the slot 222 can be reached when the pointer 226 is substantially aligned with the downward mark 230, which can indicate the first mode of transmission described herein for lowering the window shade. The second angular position of the rotary part 204 corresponding to the abutment of the resilient prong 212 with the end edge 222B of the slot 222 can be reached when the pointer 226 is substantially aligned with the upper mark 232, which can indicate the second mode of transmission described herein for raising the window shade. The relative position of the pointer 226 with respect to the downward and upward marks 230 and 232 can aid a user to easily determine a current mode of transmission, and rotate the rod assembly 118 to select the desired mode of transmission for lowering or raising the window shade.

Exemplary operation of the rod assembly 118 is described hereinafter with reference to FIGS. 21-32. In FIGS. 21 and 23, the pointer mark 226 is substantially aligned with the upward mark 232 corresponding to the second angular position of the rotary part 204 where the resilient prong 212 is in abutment against the end edge 222B of the slot 222. This position of the rotary part 204 can indicate that the switch member 136 is engaged with the ring 156 corresponding to the second mode of transmission for raising the window shade 100.

Figure 25:
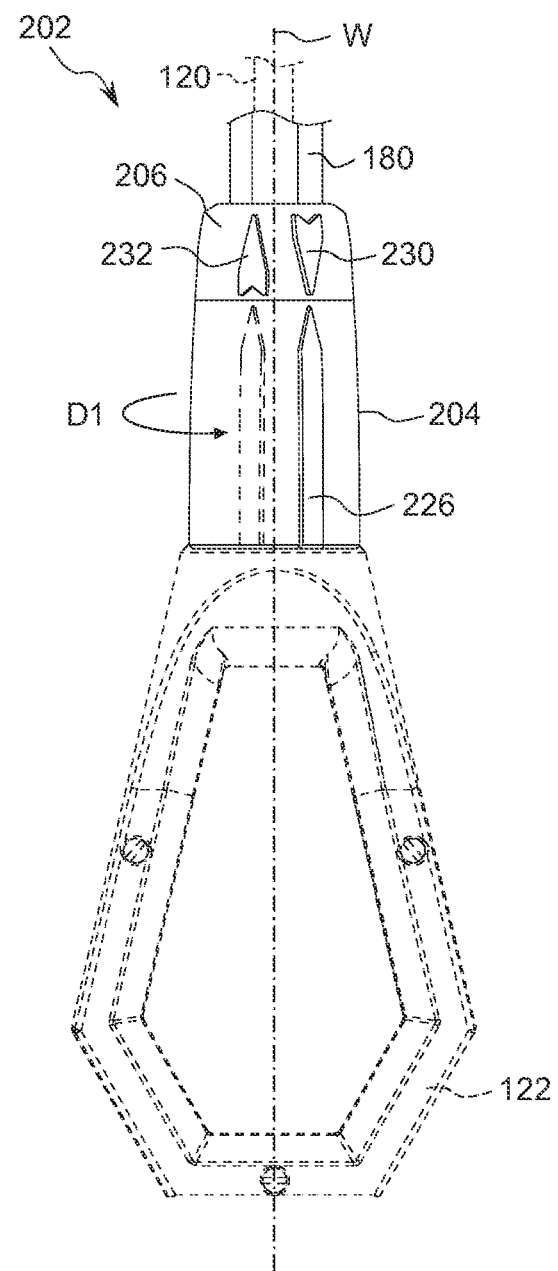
FIGS. 25-28 are schematic views illustrating exemplary operation of the indicator mechanism when the rod assembly is operated to switch from a first state for raising a window shade to a second state for lowering the window shade.
Figure 26:
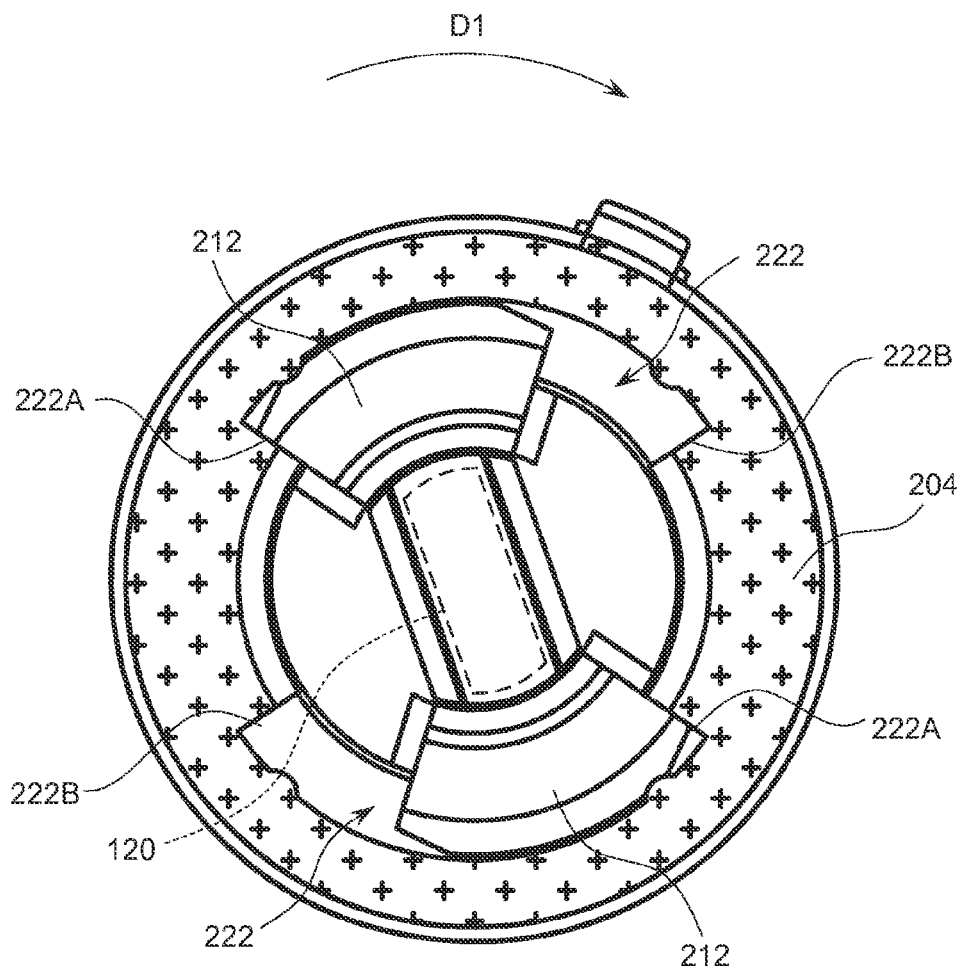
Figure 27:
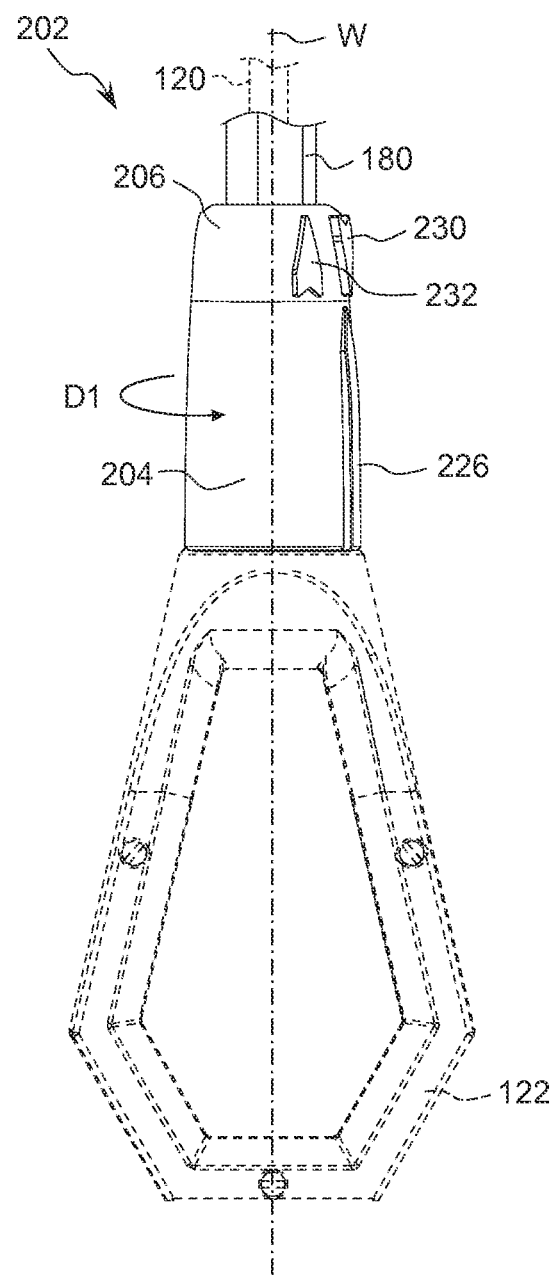
Figure 28:
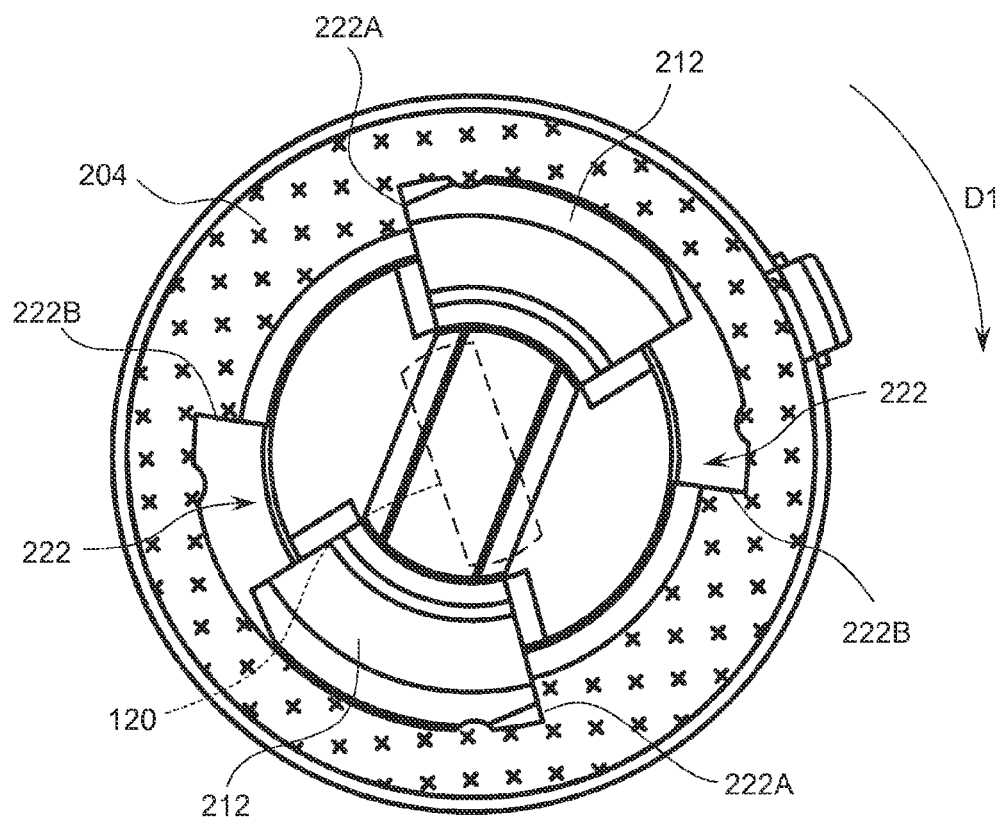

Referring to FIGS. 25-28, if a user wants to lower the window shade 100, the rotary part 204 can be rotated relative to the wand 180 in a first switching direction D1 until the pointer 226 is aligned with the downward mark 230 and the rotary part 204 is stopped in the first angular position owing to the contact between the resilient prong 212 and the end edge 222A of the slot 222, as shown in FIGS. 25 and 26. While the rotary part 204 is stopped in contact against the end edge 222A, further rotation of the rotary part 204 in the first switching direction D1 then can push the wand 180 and the joint part 181 to rotate in unison in the same direction D1 owing to the abutment between the resilient prong 212 and the end edge 222A of the slot 222 (as shown in FIGS. 27 and 28), which in turn can drive displacement of the arm 184 to have the switch member 136 engaged with the stop member 128 (as shown in FIG. 17) like previously described. The pull member 120 then can be pulled downward to lower the window shade 100.

Figure 29:
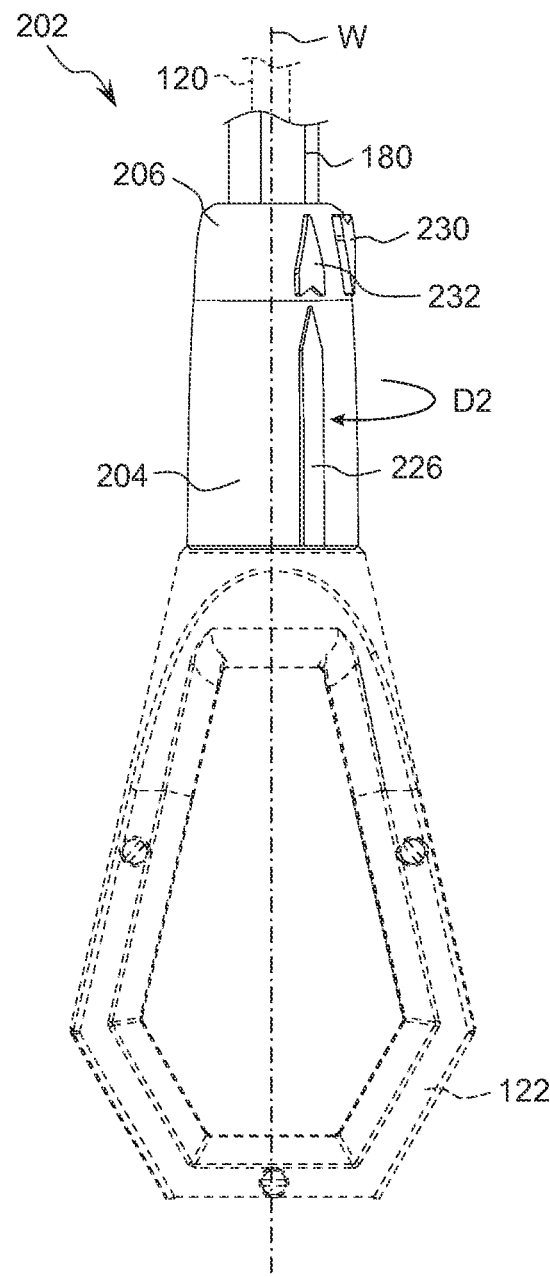
FIGS. 29-32 are schematic views illustrating exemplary operation of the indicator mechanism when the rod assembly is operated to switch from the second state for lowering the window shade to the first state for raising the window shade.
Figure 30:
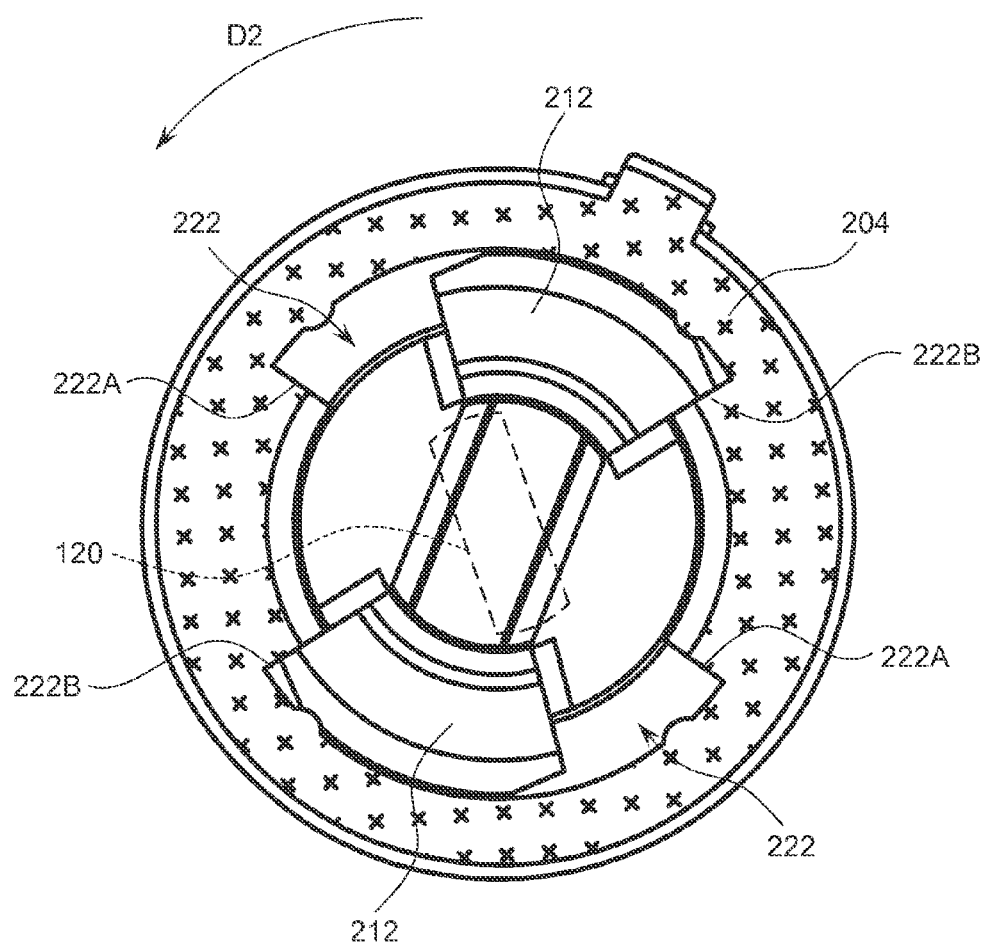
Figure 31:
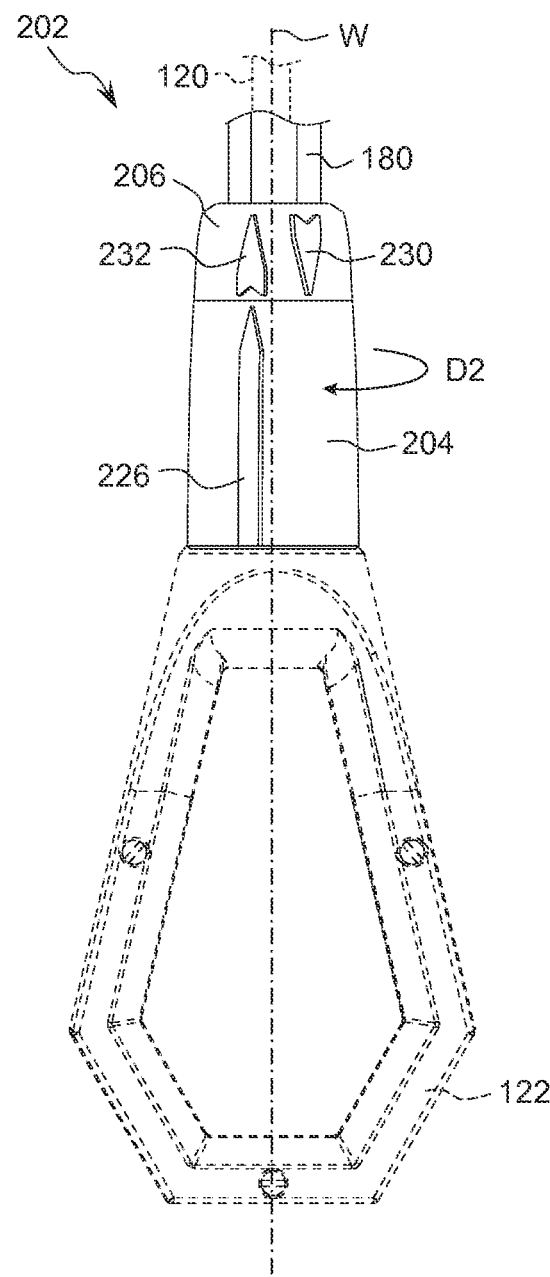
Figure 32:
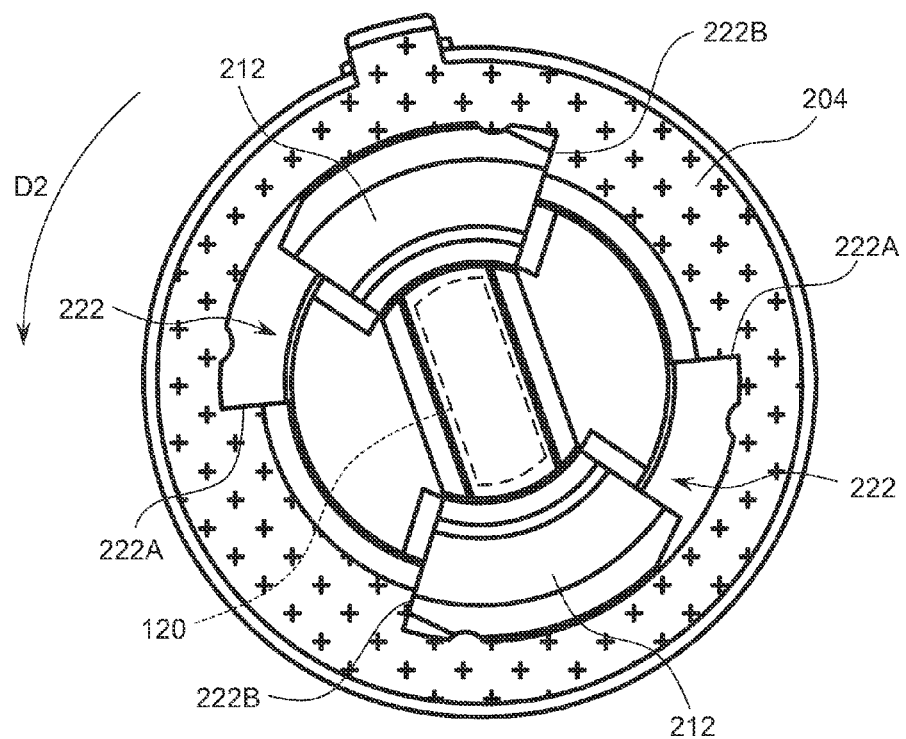

Referring to FIGS. 29-32, if a user wants to raise the window shade 100, the rotary part 204 can be rotated relative to the wand 180 in a second switching direction D2 opposite to the first switching direction D1 until the pointer 226 is aligned with the upward mark 232 and the rotary part 204 is stopped in the second angular position owing to the contact between the resilient prong 212 and the end edge 222B of the slot 222, as shown in FIGS. 29 and 30. While the rotary part 204 is stopped in contact against the end edge 222B, further rotation of the rotary part 204 in the second switching direction D2 then can push the wand 180 and the joint part 181 to rotate in unison in the same direction D2 owing to the abutment between the resilient prong 212 and the end edge 222B of the slot 222 (as shown in FIGS. 31 and 32), which in turn can drive displacement of the arm 184 to have the switch member 136 engaged with the ring 156 (as shown in FIG. 19) like previously described. The pull member 120 then can be pulled downward to raise the window shade 100. With the aforementioned switch actuating mechanism 138, the rod assembly 118 can thus be rotated in two different directions to selectively engage the switch member 136 with any of the stop member 128 and the ring 156 for switching the actuating system 108 between two modes of transmission for lowering or raising the window shade 100. Moreover, the arrangement of the indicator mechanism 202 on the rod assembly 118 can help a user to identify a current state of the actuating system 108 and select the desired mode of transmission for lowering or raising the window shade 100.

It will be appreciated that the construction and operating method of the rod assembly 118 and the indicator mechanism 202 as described herein may be implemented with other types of drive transmission assemblies different from the embodiment described herein. For example, the rod assembly 118 and the indicator mechanism 202 may also be used in association with a drive transmission assembly using an epicycloid gear arrangement as known in the prior art.

The structures described herein use an actuating system that can selectively switch between two modes of transmission for lowering or raising a window shade by rotating a rod assembly, and use a downward displacement of a pull member to lower and raise the window shade. The actuating system is simple to operate, allows convenient adjustment of the window shade, and is safe as the pull member has a limited length of extension.

Realizations of the structures and methods have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the claims that follow.

What is claimed is:

1. An actuating system for a window shade, comprising:
   a transmission axle rotatable to collapse and expand a window shade;
   a driving unit including a pull member and a ring, the pull member being operable to cause the driving unit to provide a rotational output in a first direction and drive rotation of the ring in the first direction;
   a drive transmission assembly connected with the transmission axle, wherein the drive transmission assembly includes a central gear arranged coaxial with respect to the transmission axle and rotationally coupled with the transmission axle, a plurality of planetary gears pivotally supported by a carrier and arranged around the central gear, and a switch member rotationally coupled with the carrier, the planetary gears respectively meshing with the central gear, the ring being arranged around the planetary gears and internally meshed with the planetary gears, the switch member being movable between a first and a second position to selectively enable either of a first and a second mode of transmission of the drive transmission assembly for transmitting the rotational output from the driving unit to the transmission axle, the rotational output of the driving unit in the first direction driving rotation of the transmission axle in a second direction opposite to the first direction in the first mode of transmission, and the rotational output of the driving unit in the first direction driving rotation of the transmission axle in the same first direction in the second mode of transmission; and a rod assembly connected with the switch member via a switch actuating mechanism, the switch actuating mechanism including a movable arm that holds the switch member and is connected with the rod assembly, the rod assembly being respectively rotatable in a first switching direction to displace the arm and the switch member to the first position, and in a second switching direction opposite to the first switching direction to displace the arm and the switch member to the second position;

wherein while the drive transmission assembly is in the first mode of transmission, the switch member is in the first position disengaged from the ring and engaged with a fixed stop member so that the switch member and the carrier are kept stationary, a rotation of the driving unit in the first direction that is transmitted in the first mode of transmission causing respective rotations of the planetary gears relative to the carrier, which drives rotation of the central gear and the transmission axle in the second direction opposite to the first direction;

wherein when the drive transmission assembly is in the second mode of transmission, the switch member is in the second position engaged with the ring so that the switch member and the carrier are rotatable in unison with the ring.

2. The actuating system according to claim 1, wherein the rod assembly has an end provided with a gear, and the arm has a toothed portion meshed with the gear, a rotation of the rod assembly causing a sliding movement of the arm and the switch member.

3. The actuating system according to claim 2, wherein the arm slides along a displacement axis substantially parallel to the transmission axle.

4. The actuating system according to claim 1, wherein the arm is arranged through a housing portion that is affixed with a detent, the detent retaining the switch member in any of the first and second position.

5. The actuating system according to claim 1, wherein the arm is affixed with a bracket that pivotally supports the switch member.

6. The actuating system according to claim 1, wherein the rod assembly includes:
a wand extending along a lengthwise axis, and
a rotary part pivotally connected with the wand, the rotary part being rotatable about the lengthwise axis of the wand.

7. The actuating system according to claim 6, wherein the rotary part is restricted to rotate relative to the wand within an angular range defined between a first and a second angular position, the rotary part being rotated to the first angular position to displace the switch member to the first position, and the rotary part being rotated to the second angular position to displace the switch member to the second position.

8. The actuating system according to claim 7, wherein the wand has a marking visually indicating the first and second angular position of the rotary part.

9. The actuating system according to claim 6, wherein a portion of the pull member is arranged through a hollow interior of the wand and a hollow interior of the rotary part.

10. The actuating system according to claim 6, wherein the pull member has an end connected with a handle that is positionable adjacent to the rotary part.

11. The actuating system according to claim 1, wherein the first mode of transmission is selected to lower a window shade, and the second mode of transmission is selected to raise the window shade.

12. The actuating system according to claim 1, wherein the switch member is assembled for sliding relative to the carrier along the axis of the transmission axle.

13. The actuating system according to claim 1, wherein the switch member has a plurality of first teeth protruding toward the stop member, and a plurality of second teeth protruding toward the ring at a side opposite to that of the first teeth.

14. The actuating system according to claim 1, further including a casing having a cavity, and a spring arranged in the cavity and having two spaced-apart prongs, the transmission axle having a first and a second flange surface, the first flange surface being able to push against a first one of the two prongs for enlarging the spring while the ring remains stationary, the enlarged spring being in frictional engagement with an inner sidewall of the cavity to prevent rotation of the transmission axle.

15. The actuating system according to claim 14, wherein the transmission axle is connected with an actuating part, the actuating part pushing against either of the two prongs for contracting the spring when the transmission axle rotates in the first or second direction, the contracted spring thereby loosening the frictional engagement with the inner sidewall.

16. The actuating system according to claim 1, wherein the driving unit further includes a spool, the spool being spring biased to rotate in the second direction to wind the pull member while the transmission axle remains stationary.

17. A window shade comprising:
a head rail, a bottom part, and a shading structure arranged vertically between the head rail and the bottom part;
a winding unit having a suspension member connected with the bottom part; and
the actuating system according to claim 1, being arranged in the head rail, the winding unit being rotationally coupled with the transmission axle, wherein the transmission axle rotates in the second direction to cause unwinding of the suspension member from the winding unit for lowering the bottom part, and in the first direction to wind the suspension member into the winding unit for raising the bottom part.

18. The actuating system according to claim 1, wherein the arm pivotally supports the switch member.

19. An actuating system for a window shade, comprising:
a transmission axle rotatable to collapse and expand a window shade;
a driving unit including a pull member, the pull member being operable to cause the driving unit to provide a rotational output in a first direction;
a drive transmission assembly connected with the transmission axle and including a switch member, the switch member being movable between a first and a second position to selectively enable either of a first and a second mode of transmission of the drive transmission assembly for transmitting the rotational output from the driving unit to the transmission axle, the rotational output of the driving unit in the first direction driving rotation of the transmission axle in a second direction opposite to the first direction in the first mode of transmission, and the rotational output of the driving unit in the first direction driving rotation of the transmission axle in the same first direction in the second mode of transmission; and a rod assembly connected with the switch member via a switch actuating mechanism, the switch actuating mechanism including a movable arm that holds the switch member and is connected with the rod assembly, the rod assembly being respectively rotatable in a first switching direction to displace the arm and the switch member to the first position, and in a second switching direction opposite to the first switching direction to displace the arm and the switch member to the second position;

wherein the rod assembly includes a wand extending along a lengthwise axis, and a rotary part pivotally connected with the wand and rotatable about the lengthwise axis of the wand, the rotary part being restricted to rotate relative to the wand within an angular range defined between a first and a second angular position, the rotary part being rotated to the first angular position to displace the switch member to the first position, and the rotary part being rotated to the second angular position to displace the switch member to the second position.

20. The actuating system according to claim 19, wherein the rod assembly has an end provided with a gear, and the arm has a toothed portion meshed with the gear, a rotation of the rod assembly causing a sliding movement of the arm and the switch member.

21. The actuating system according to claim 20, wherein the arm slides along a displacement axis substantially parallel to the transmission axle.

22. The actuating system according to claim 19, wherein the arm is arranged through a housing portion that is affixed with a detent, the detent retaining the switch member in any of the first and second position.

23. The actuating system according to claim 19, wherein the arm is affixed with a bracket that pivotally supports the switch member.

* * * * *